United States Patent [19]
Gillingham et al.

[11] Patent Number: 5,820,646
[45] Date of Patent: *Oct. 13, 1998

[54] INLINE FILTER APPARATUS

[75] Inventors: Gary R. Gillingham, Prior Lake; Wayne M. Wagner; Joseph C. Tokar, both of Apple Valley; Daniel T. Risch; Jim C. Rothman, both of Burnsville; Fred H. Wahlquist, Bloomington, all of Minn.

[73] Assignee: Donaldson Company, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 639,371

[22] Filed: Apr. 26, 1996

[51] Int. Cl.⁶ ........................................ B01D 27/06
[52] U.S. Cl. .................. 55/488; 55/498; 55/510; 55/521; 55/523; 55/DIG. 30
[58] Field of Search .............................. 55/470, 482, 486, 55/487, 488, 495, 498, 510, 523, 521, DIG. 5, DIG. 30

[56] References Cited

U.S. PATENT DOCUMENTS

| | | |
|---|---|---|
| 1,639,132 | 8/1927 | Greene . |
| 1,639,133 | 8/1927 | Greene . |
| 1,729,135 | 9/1929 | Slauson . |
| 2,019,186 | 10/1935 | Kaiser . |
| 2,038,071 | 4/1936 | Wilhelm . |
| 2,190,886 | 2/1940 | Schaaf et al. . |
| 2,210,397 | 8/1940 | Dreiss . |
| 2,322,548 | 6/1943 | Sigmund . |
| 2,397,759 | 4/1946 | Sigmund . |
| 2,599,604 | 6/1952 | Bauer et al. . |
| 2,717,659 | 9/1955 | Schuldt . |
| 2,726,184 | 12/1955 | Cox et al. . |
| 3,020,977 | 2/1962 | Huppke et al. . |
| 3,025,963 | 3/1962 | Bauer . |
| 3,025,964 | 3/1962 | Summers et al. . |
| 3,037,637 | 6/1962 | Bub . |
| 3,070,937 | 1/1963 | Bub . |
| 3,076,554 | 2/1963 | Bub . |
| 3,112,184 | 11/1963 | Hollenbach . |
| 3,112,262 | 11/1963 | Parkinson . |
| 3,279,616 | 10/1966 | Bourdale . |
| 3,323,963 | 6/1967 | Summers . |
| 3,346,121 | 10/1967 | Bally . |
| 3,372,533 | 3/1968 | Rummel . |
| 3,759,391 | 9/1973 | Dreher . |
| 3,800,515 | 4/1974 | Asker et al. . |
| 3,807,150 | 4/1974 | Maracle . |
| 3,858,793 | 1/1975 | Dudrey . |
| 3,878,594 | 4/1975 | Minor, Jr. et al. . |

(List continued on next page.)

FOREIGN PATENT DOCUMENTS

| | | |
|---|---|---|
| 0 025 584 | 3/1981 | European Pat. Off. . |
| 0 059 562 A1 | 2/1992 | European Pat. Off. . |
| 0 625 367 A1 | 4/1994 | European Pat. Off. . |
| 0 630 672 A1 | 5/1994 | European Pat. Off. . |
| 1.193.833 | 11/1959 | France . |
| 2.148.726 | 3/1973 | France . |
| 671 096 | 2/1939 | Germany . |
| 394065 | 1/1974 | U.S.S.R. . |
| 717304 | 10/1954 | United Kingdom . |
| 764846 | 1/1957 | United Kingdom . |
| 868058 | 5/1961 | United Kingdom . |
| 1 579 881 | 11/1980 | United Kingdom . |
| 1 579 882 | 11/1980 | United Kingdom . |
| 1 579 883 | 11/1980 | United Kingdom . |
| WO 83/01582 | 5/1983 | WIPO . |

*Primary Examiner*—Jay H. Woo
*Assistant Examiner*—Minh-Chau T. Pham
*Attorney, Agent, or Firm*—Merchant, Gould, Smith, Edell, Welter & Schmidt

[57] ABSTRACT

A filter device inserts into a duct having flow passing from upstream to downstream. The filter device includes fluted filter media having flutes formed therein. The filter forms a seal between the outer edge of the filter and the downstream side of the duct. The filter media may be rolled or stacked in layers to match the shape of the duct.

28 Claims, 17 Drawing Sheets

U.S. PATENT DOCUMENTS

| | | |
|---|---|---|
| 3,962,097 | 6/1976 | Reiman et al. . |
| 3,966,646 | 6/1976 | Noakes et al. . |
| 4,039,457 | 8/1977 | Schacht et al. . |
| 4,065,341 | 12/1977 | Cub . |
| 4,181,513 | 1/1980 | Fukuda et al. . |
| 4,199,387 | 4/1980 | Hladik . |
| 4,289,513 | 9/1981 | Brownhill et al. . |
| 4,310,419 | 1/1982 | Nara et al. . |
| 4,410,427 | 10/1983 | Wydeven . |
| 4,430,223 | 2/1984 | Miyakawa et al. . |
| 4,439,321 | 3/1984 | Taki et al. . |
| 4,441,899 | 4/1984 | Takagi et al. . |
| 4,460,388 | 7/1984 | Fukami et al. . |
| 4,589,983 | 5/1986 | Wydevan . |
| 4,652,286 | 3/1987 | Kusuda et al. . |
| 4,695,300 | 9/1987 | Takagi . |
| 4,704,863 | 11/1987 | Abthoff et al. . |
| 4,728,426 | 3/1988 | Rudinger et al. . |
| 4,767,427 | 8/1988 | Barabas et al. ............................ 55/498 |
| 4,925,561 | 5/1990 | Ishii et al. . |
| 5,015,379 | 5/1991 | Drori . |
| 5,053,065 | 10/1991 | Garay et al. .............................. 55/470 |
| 5,063,007 | 11/1991 | Gabathuler et al. . |
| 5,066,432 | 11/1991 | Gabathuler et al. . |
| 5,125,940 | 6/1992 | Stanhope et al. ......................... 55/498 |
| 5,167,683 | 12/1992 | Behrendt et al. ......................... 55/498 |
| 5,174,895 | 12/1992 | Drori . |
| 5,223,011 | 6/1993 | Hanni ....................................... 55/495 |
| 5,304,351 | 4/1994 | Tanaka et al. ............................ 55/498 |
| 5,316,676 | 5/1994 | Drori . |
| 5,322,537 | 6/1994 | Nakamura et al. . |
| 5,487,767 | 1/1996 | Brown . |
| 5,512,074 | 4/1996 | Hanni et al. .............................. 55/495 |
| 5,512,075 | 4/1996 | Ninomiya et al. . |
| 5,525,136 | 6/1996 | Rosen ....................................... 55/486 |
| 5,547,480 | 8/1996 | Coulonvaux .............................. 55/498 |
| 5,556,440 | 9/1996 | Mullins et al. ........................... 55/498 |

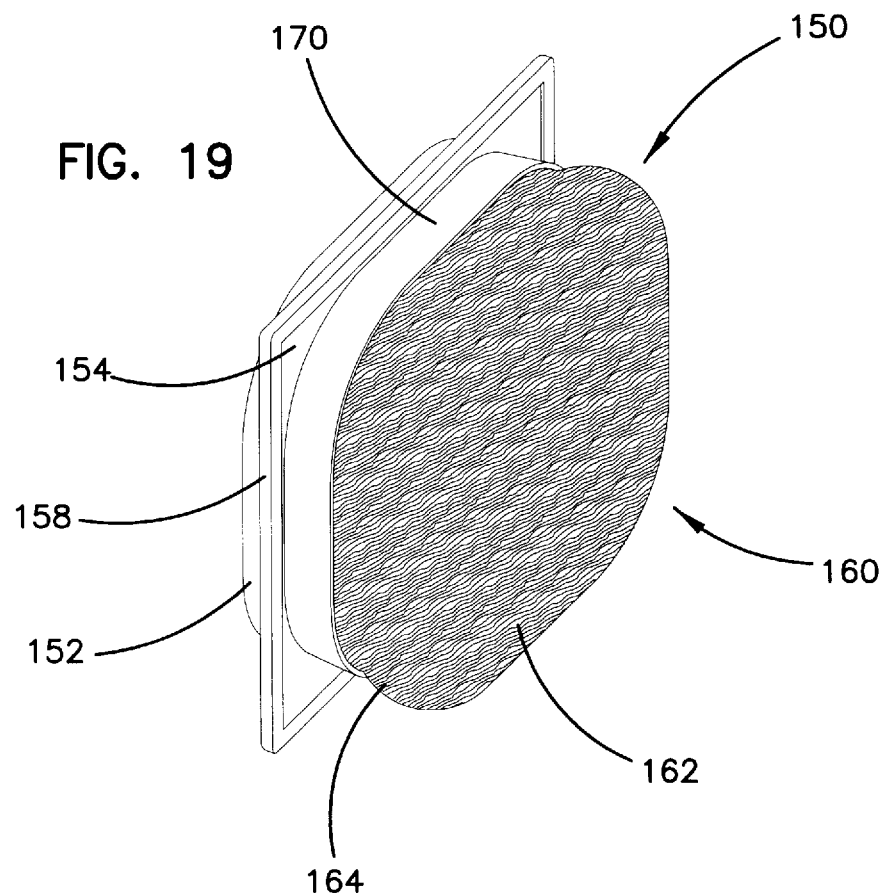
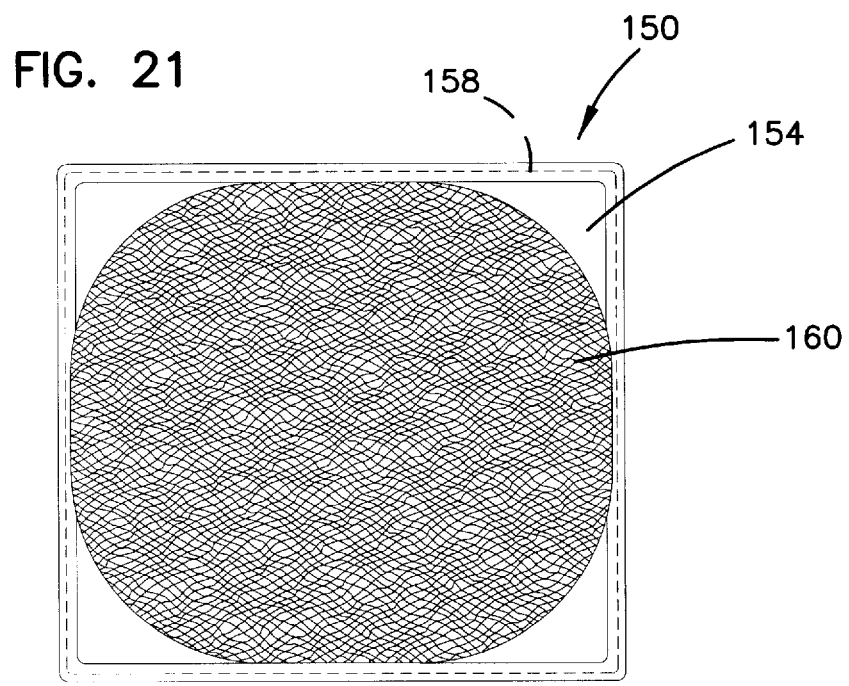

INLINE FILTER APPARATUS

BACKGROUND OF THE INVENTION

1. Field of the Invention

The present invention relates to a filtering apparatus, and in particular, to a filtering apparatus having fluted filtering media which is placed inline into a duct or other passage.

2. Prior Art

Filters which are placed inline for filtering gases or liquids are well known and are commonly utilized for many types of filtering applications. Although prior filter devices are able to satisfactorily filter a substantial portion of the particulate and other materials from gases and liquids, still further improvements are possible. Filtering efficiency, especially for small particles and soot, and pressure differential across the filter are critical in many filtering applications.

A common problem with filter designs is inadequate filter surface area. Prior attempts to improve the effective filtering surface area for a given volume of filter have not been entirely successful. Pleated filters are commonly used which utilize a pleated filter media. Although pleated material may increase the filter area, as the pleats are placed closer and closer together, and more and more filter media is placed in any given volume, the pleats are pressed tighter and tighter together, thereby restricting the flow. As the velocity of the flow must increase to pass through the filtering media, pressure differential across the filter increases. This may cause additional problems, especially in certain engine and turbine filtering applications.

As with pleated filters, most permeable filtering media does not provide structural support. Therefore, the filters require structurally-supporting housings for the filter materials. The additional mass of the housing increases the weight and cost of the filter. There may be applications wherein only a simple seal is needed between the duct and outer membrane of the filter element to effect an enclosed chamber for the filtered fluid, but a heavier housing must be used to support the filtering media.

In addition to the problems of prior filters relating to pressure differential and media area, prior filter designs are not adaptable to a wide variety of shapes and cross sections. In particular, there may be applications where an increased flow receiving area having improved flow distribution for an inline filter may be required. Such a design may not be possible with pleated filters or other standard filtering media configurations. In addition, specific shapes or filter profiles may be required which may not easily be achieved with prior art filters.

Many inline filters have radial flow wherein the gas or liquid enters a center chamber and flows radially outward to a radially directed outlet. The changes in direction affect the fluid flow and lead to greater pressure differential across the filter. The inlet and outlet do not provide for straight through inline flow, often leading to additional ductwork and further upstream or downstream flow directional changes.

It can be appreciated that the automobile air filter has evolved significantly. The first filters had oil applied to the filter media for trapping particulate. Filter configuration changed to a pleated filter in an annular configuration positioned on top of the engine as filter technology improved. Filters in present automobiles typically utilize a panel-type filter configured to fit into the crowded spaces of smaller engine compartments. However, it can be appreciated that more efficient and smaller filters are needed with current and future vehicle designs.

Automobile engine air filters present special filtering problems. As automobile technology changes, greater emphasis is placed on improved passenger compartment room, while giving less space for the engine and related components. For example, recent cab forward designs move the passenger compartment forward and require transverse mounting of the engine with limited space for elements such as filters and related duct work. Smaller and smaller filters having the same or improved efficiency are needed to provide additional space for other components or for the passengers. In addition, semi-trucks and heavy-duty equipment often utilize air filters on the outside of the engine compartment and cab. For aerodynamics and appearance, as well as to improve visibility for the drivers and operators, manufacturers are moving the exterior filters into the engine compartment or under the hood, thereby adding to the space required.

Automobile manufacturers are attempting to achieve greater intervals between service. Many new models hope to delay servicing until 100,000 miles of use. It is preferred that the air filters utilized also be able to accept higher loading and be able to comply with the longer service intervals before replacement.

In addition to the more difficult space requirements and the life requirements of filters, greater performance is also being demanded from the air filters. Higher performance engines trying to achieve improved fuel efficiency often require much greater air flow rates. Such flows are achieved while trying to minimize the restriction at the filter. In addition, popularity of off-road vehicles with performance required in extremely harsh operating conditions requires improved filtering efficiencies while also requiring greater loading capacity so that filters do not need to be replaced at shortened intervals. The engine designs also require flexibility in filtering configurations so that the filter may adapt to the particular engine and vehicle model which are being produced.

A prior art filter which attempts to overcome these problems is shown in U.S. Pat. No. 2,019,186 to Kaiser. Although the Kaiser patent shows corrugated type filtering media, it must be dipped in oil or other substance which cause particulate to adhere to the filter material. U.S. Pat. No. 4,310,419 to Nara et al. provides greater filter density, but requires radial flow. U.S. Pat. No. 4,289,513 shows corrugated or fluted filters, but provides only open flutes so that fluid may not actually pass through the filter media. U.S. Pat. No. 4,065,341 shows a method of making a spiral fluted filter, but the filter requires radial flow through the filter media.

It can be seen then that a new and improved filtering apparatus is needed. In particular, such a filtering apparatus should be structurally self-supporting to reduce support required from the filter housing. In addition, such an apparatus should provide increased filter media area for a given volume, thereby decreasing the pressure drop across the filter and the total volume required for the filter. The filter should provide for straight through flow rather than radial flow. Such a filter should also adapt to a variety of shapes and configurations and be easily inserted or removed from the flow. The present invention addresses these, as well as other problems associated with filtering apparatuses.

SUMMARY OF THE INVENTION

The present invention is directed to a filter apparatus and in particular, to a fluted filter apparatus which inserts inline into a duct and has substantially straight-through flow.

According to the present invention, permeable fluted filter media is utilized to provide a structurally self-supporting filter element. The fluted filter element includes planar layers or spirally-wound layers of fluted filter material having a corrugated layer and a facing sheet applied to one side with a beaded first end. The bead is then applied over the other side of the corrugated layer and the layer is pressed against an adjacent sheet to form a fluted filter layer having a series of adjacent flute chambers with alternating sealed ends. Therefore, flow through the upstream end enters the open fluted chambers and passes through the filtering media to the flute chambers having their downstream ends open, thereby filtering the fluid.

According to a first embodiment of the present invention, a filter element is placed in a housing which has a diameter which is enlarged relative to the upstream and downstream duct. In this manner, a larger filter media area is provided with a substantially smaller volume. Moreover, flow restrictions and pressure drop across the filter are decreased.

Alternate embodiments of the present invention provide for a variety of shapes and may also include a prefilter material upstream or around the filter element. Filter element shapes include cylinders, blocks, V-shaped elements, and oval-faced filter elements. Housings may be a simple seal downstream of the filter element or a housing including an inlet and outlet. The various embodiments provide for substantially straight-through flow wherein the upstream and downstream flow directions are substantially unchanged. It can be appreciated that the present invention provides for adapting to a wide variety of filtering shapes and passages.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding elements throughout the several views:

FIG. 19 shows a perspective view of the filter element shown in FIG. 17 with a prefilter element attached;

FIG. 21 shows a top plan view of the filter element shown in FIG. 19;

DETAILED DESCRIPTION OF THE PREFERRED EMBODIMENT

Figure 1:
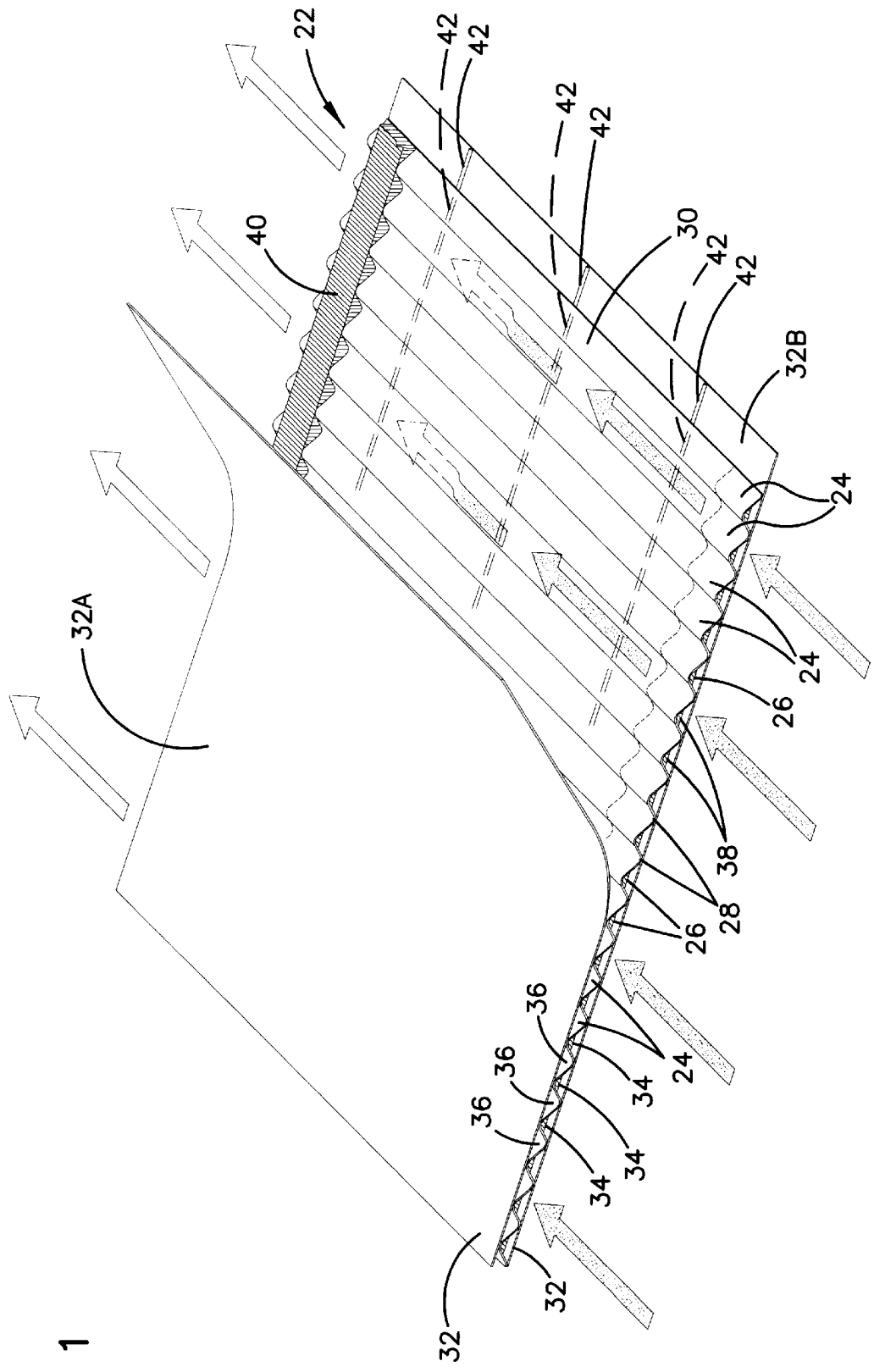
FIG. 1 shows a perspective view of double-faced fluted filter media for the filter apparatus according to the principles of the present invention.
Figure 23:
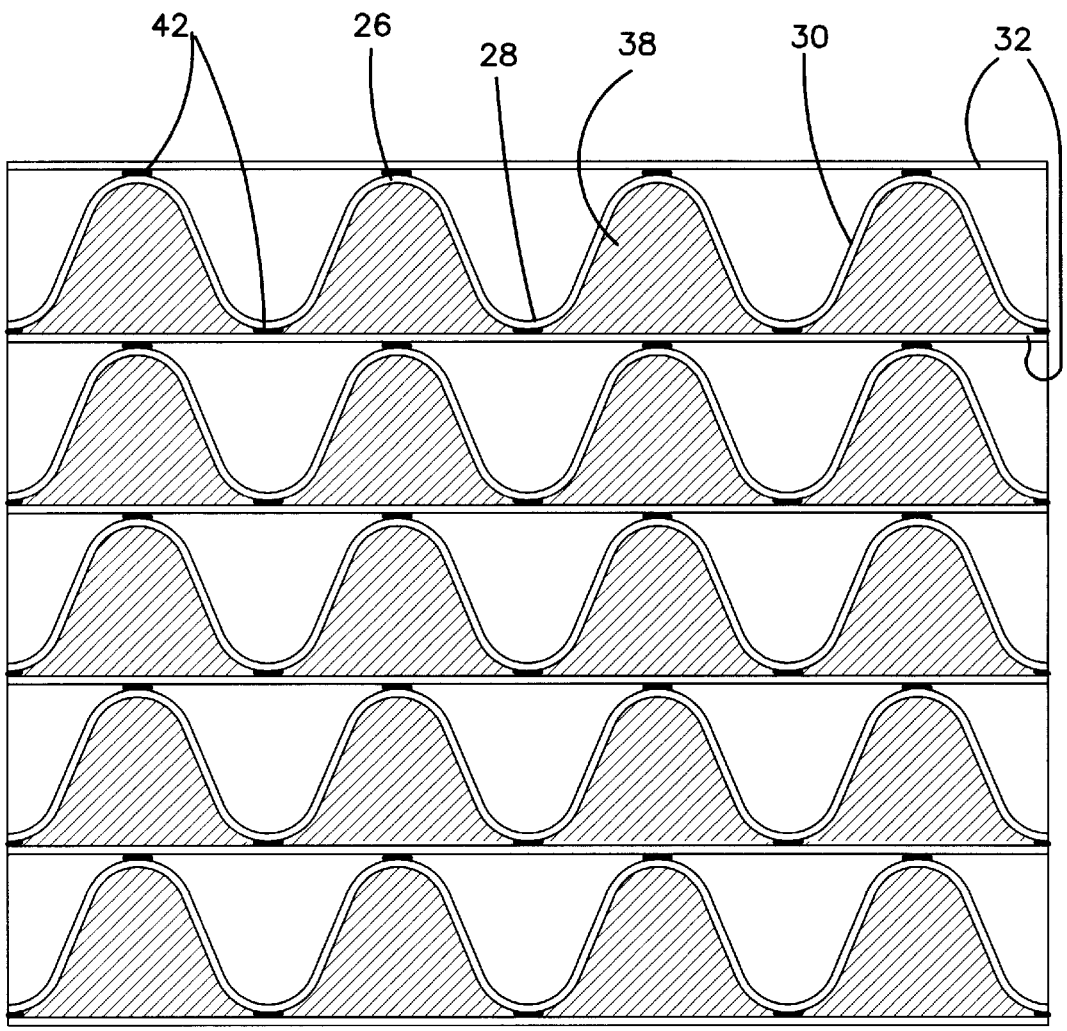
FIG. 23 shows a sectional view of layered fluted filter media taken transverse to the longitudinal direction of the flutes.

Referring now to the drawings, and in particular to FIG. 1, there is shown a portion of a layer of double-faced permeable fluted filter media, generally designated 22. The fluted filter media 22 includes a multiplicity of flutes 24 which form a modified corrugated-type material. The flute chambers 24 are formed by a center fluting sheet 30 forming alternating peaks 26 and troughs 28 mounting between facing sheets 32, including a first facing sheet 32A and a second facing sheet 32B. The troughs 28 and peaks 26 divide the flutes into an upper row and lower row. In the configuration shown in FIG. 1, the upper flutes form flute chambers 36 closed at the downstream end, while upstream closed end flutes 34 are the lower row of flute chambers. The fluted chambers 34 are closed by first end bead 38 filling a portion of the upstream end of the flute between the fluting sheet 30 and the second facing sheet 32B. Similarly, a second end bead 40 closes the downstream end of alternating flutes 36. Adhesive tacks 42 connect the peaks 26 and troughs 28 of the flutes 24 to the facing sheets 32A and 32B. In a preferred embodiment, the adhesive of the tacks 42 is placed only at the apexes of the peaks 26 and troughs 28, rather than as a continuous bead, as shown in FIG. 23. The minimal amount of adhesive keeps the chambers 24 of the flutes open to accept increased fluid flow. The flutes 24 and end beads 38 and 40 provide a filter element which is structurally self-supporting without a housing.

When filtering, unfiltered fluid enters the flute chambers 36 which have their upstream ends open as indicated by the shaded arrows. Upon entering the flute chambers 36, the unfiltered fluid flow is closed off by the second end bead 40. Therefore, the fluid is forced to proceed through the fluting sheet 30 or face sheets 32. As the unfiltered fluid passes through the fluting sheet 30 or face sheets 32, the fluid is filtered through the filter media layers, as indicated by the unshaded arrow. The fluid is then free to pass through the flute chambers 34, which have their upstream end closed and to flow out the downstream end out the filter media 22. With the configuration shown, the unfiltered fluid can filter through the fluted sheet 30, the upper facing sheet 32A or lower facing sheet 32B, and into a flute chamber 34 blocked on its upstream side.

Figure 16:
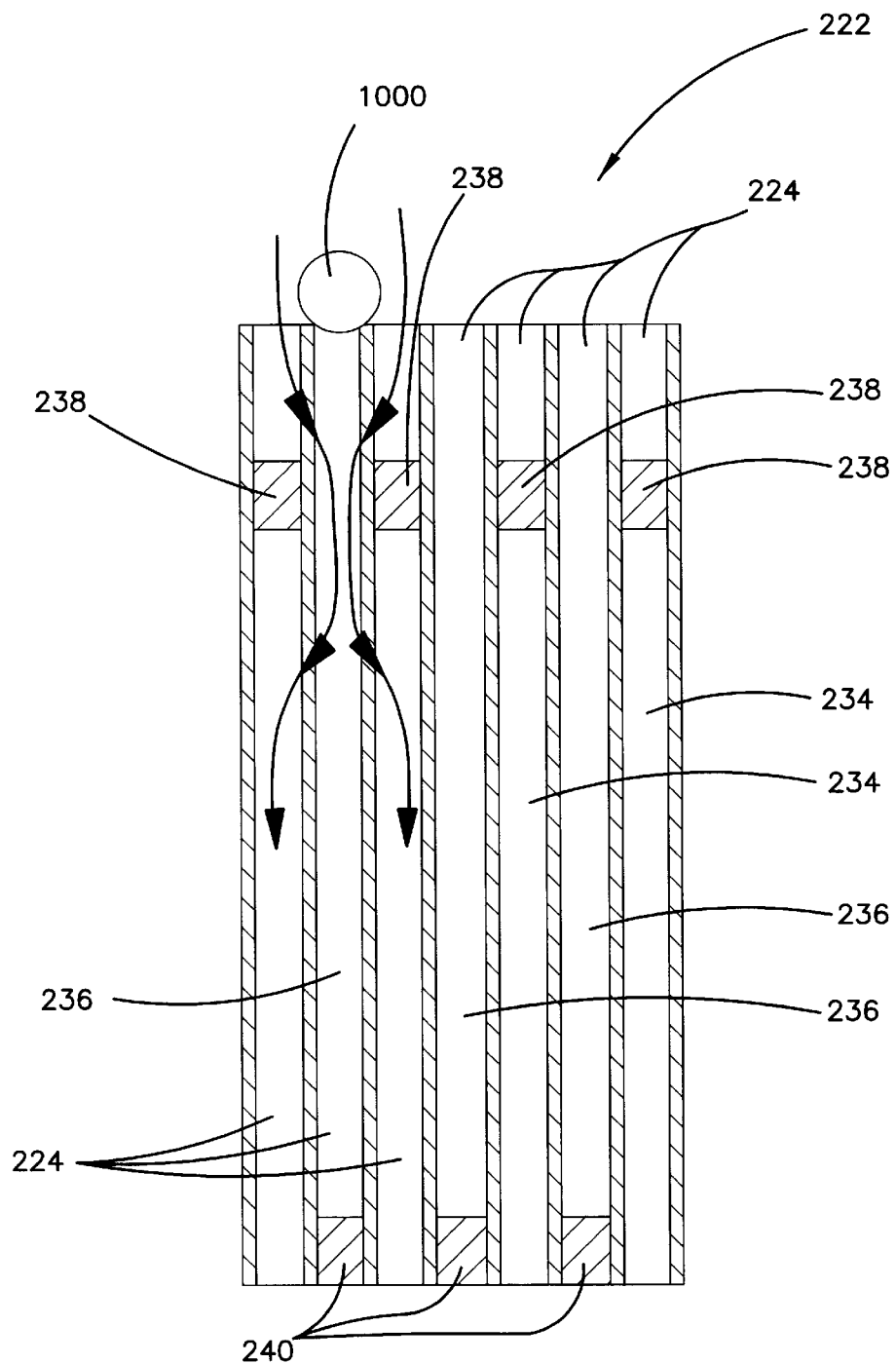
FIG. 16 shows a sectional view of a second embodiment of fluted filter media with a filter inlet variation.

Referring now to FIG. 16, there is shown a second embodiment of the present invention with fluted filter media 222. The fluted filter media 222 is similar to the fluted filter media 22, shown in FIG. 1, but having a modified bead configuration, as explained hereinafter. As shown in FIG. 16, fluted filter media 222 includes flutes 224 having peaks and troughs with flutes 234 closed upstream and flutes 236 closed downstream. However, unlike other fluted filters, the flutes 234 include a bead 238 sealing off the flute chamber which is recessed from the upstream edge of the filter media 222. The flutes 236 have beads 240 which are at the downstream end and may or may not be recessed away from the downstream edge.

The filter media 222 provides performance advantages as it can be appreciated that large particles may accumulate at the upstream face of the filter media. As shown in FIG. 16, if the particles 1000 are large enough, some of the flutes 224 may become completely blocked off. For prior filter media, if several flutes are blocked off, the blockage 1000 has greater impact as alternating surrounding flutes are blocked at their upstream side, creating increased flow redirection around the blocked flutes. However, as shown in FIG. 16, when flutes 234 are sealed at their upstream side at 238 and recessed from the upstream edge, when a particle 1000 blocks an adjacent downstream closed flute 236, the configuration allows the flow to pass into the upstream end of the flutes 234 and through the fluting sheet 230 or other filter material upstream of the seal 238. In this manner, the fluid flows into flute 236 where it is forced back through the filtering material into the flutes 234 which are open to the downstream side of the filter. This reduces clogging and provides for better flow without pressure buildup or otherwise adversely affecting filter performance. In a preferred embodiment, the upstream sealing beads 238 are recessed from approximately ¼" to 1" from the upstream edge. In this manner, the fluted material is still self supporting while decreasing the effects of clogging at the upstream face of the filter media 222.

Figure 2:
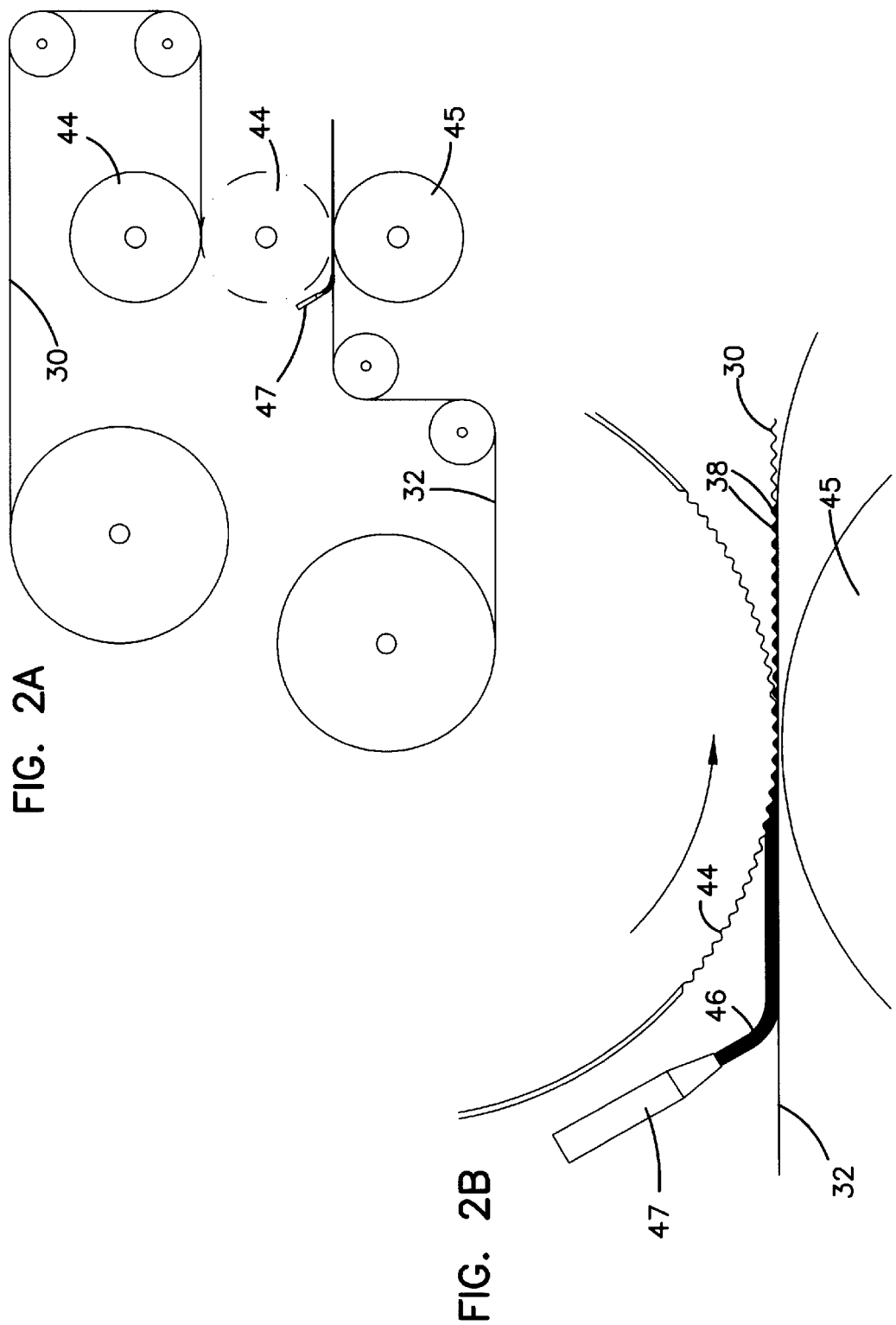
FIG. 2A–2B show diagrammatic views of the process of manufacturing the filter media shown in FIG. 1.

Referring now to FIGS. 2A–2B, the manufacturing process for fluted filter media which may be stacked or rolled to form filter elements, as explained hereinafter, is shown. It can be appreciated that when the filter media is layered or spiraled, with adjacent layers contacting one another, only one facing sheet 32 is required as it can serve as the top for one fluted layer and the bottom sheet for another fluted layer. Therefore, it can be appreciated that the fluted sheet 30 need be applied to only one facing sheet 32.

As shown in FIG. 2A, a first filtering media sheet 30 is delivered from a series of rollers to opposed crimping rollers 44 forming a nip. The rollers 44 have intermeshing wavy surfaces to crimp the first sheet 30 as it is pinched between the rollers 44 and 45. As shown in FIG. 2B, the first now corrugated sheet 30, and a second flat sheet of filter media 32 are fed together to a second nip formed between the first of the crimping rollers 44 and an opposed roller 45. A sealant applicator 47 applies a sealant 46 along the upper surface of the second sheet 32 prior to engagement between the crimping roller 44 and the opposed roller 45. At the beginning of a manufacturing run, as the first sheet 30 and second sheet 32 pass through the rollers 44 and 45, the sheets fall away. However as sealant 46 is applied, the sealant 46 forms first end bead 38 between the fluted sheet 30 and the facing sheet 32. The troughs 28 have tacking beads 42 applied at spaced intervals along their apex or are otherwise attached to the facing sheet 32 to form flute chambers 34. The resultant structure of the facing sheet 32 sealed at one edge to the fluted sheet 30 is single-faced layerable filter media 48, shown in FIG. 4.

Figure 3:
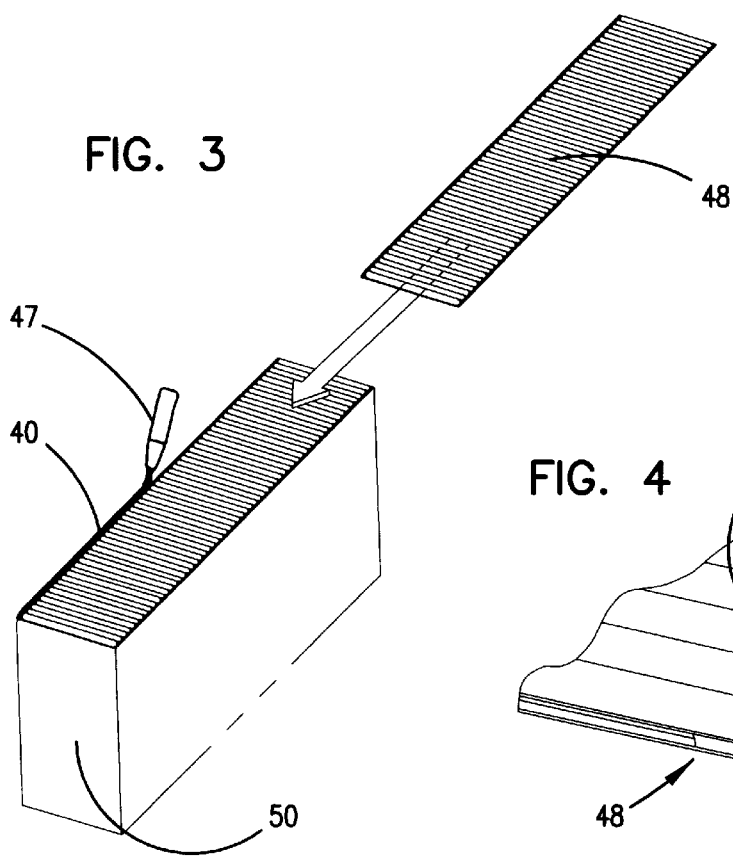
FIG. 3 shows a perspective view of the fluted filter media layered in a block configuration according to the principles of the present invention.
Figure 4:
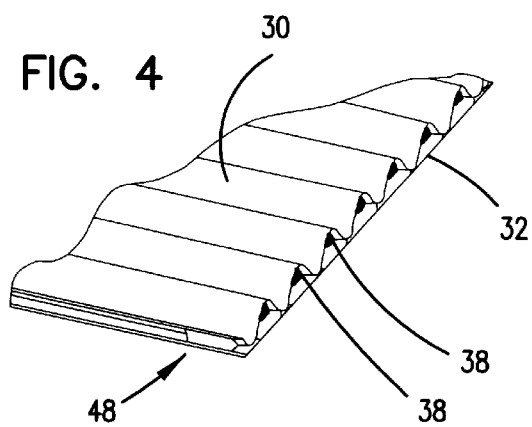
FIG. 4 shows a detail perspective view of a layer of single-faced filter media for the filter element shown in FIG. 3.

Referring now to FIG. 3, it can be appreciated that the single-faced filter media layer 48 having a single backing sheet 32 and a single end bead 38 can be layered to form a block-type filter element, generally designated 50. It can be appreciated that a second bead 40 is laid down on an opposite edge outside of the flutes so that adjacent layers 48 can be added to the block 50. In this manner, first end beads 38 are laid down between the top of the facing sheet and the bottom of the fluted sheet 30, as shown in FIG. 4, while the space between the top of the fluting sheet 30 and the bottom of the facing sheet 32 receives a second bead 40. In addition, the peaks 26 are tacked to the bottom of the facing sheet 32 to form flutes 36. In this manner, a block of fluted filter media 50 is achieved utilizing the fluted layers 48 shown in FIG. 4. The filter element 50 includes adjacent flutes having alternating first closed ends and second closed ends to provide for substantially straight-through flow of the fluid between the upstream flow and the downstream flow.

Figure 5:
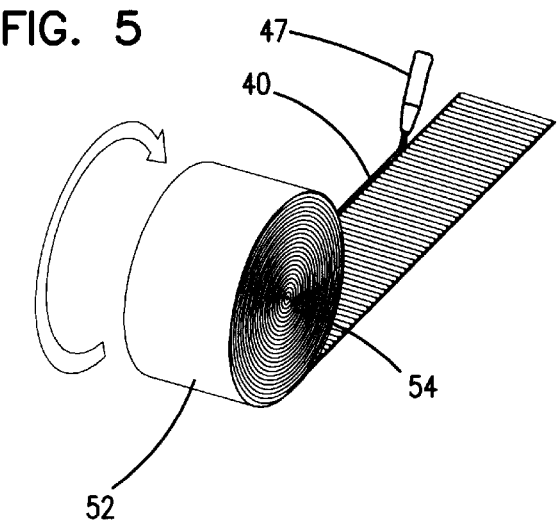
FIG. 5 shows a perspective view of the fluted filter media spiraled in a cylindrical configuration according to the principles of the present invention.
Figure 6:
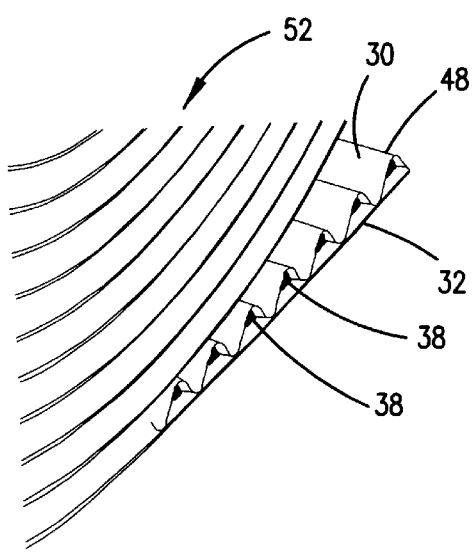
FIG. 6 shows a detail perspective view of a portion of the spiraled fluted filter media for the filter element shown in FIG. 5.

Turning now to FIGS. 5 and 6, it can be appreciated that the single-faced filter media 48 shown in FIG. 4 can be spiraled to form a cylindrical filtering element 52. The cylindrical filter element 52 is wound about a center mandrel 54 or other element to provide a mounting member for winding, which may be removable or left to plug the center. It can be appreciated that non-round center winding members may be utilized for making other filtering element shapes, such as filter elements having an oblong or oval profile. In addition, the filter elements may be selectively compressed prior to the sealant material hardening for shaping the elements. As a first bead 38, as shown in FIG. 4, has already been laid down on the filter media layer 48, it is necessary to lay down a second bead 40 with the sealing device 47, shown in FIG. 5, at a second end on top of the fluted layer 30. Therefore, the facing sheet 32 acts as both an inner facing sheet and exterior facing sheet, as shown in detail in FIG. 6. In this manner, a single facing sheet 32 wound in layers is all that is needed for forming a cylindrical fluted filtering element 52. It can be appreciated that the outside periphery of the filter element 52 must be closed to prevent the spiral from unwinding and to provide an element sealable against a housing or duct. Although in the embodiment shown, the single faced filter media layers 48 are wound with the flat sheet 32 on the outside, there may be applications wherein the flat sheet 32 is wound on the inside of the corrugated sheet 30.

Figure 7:
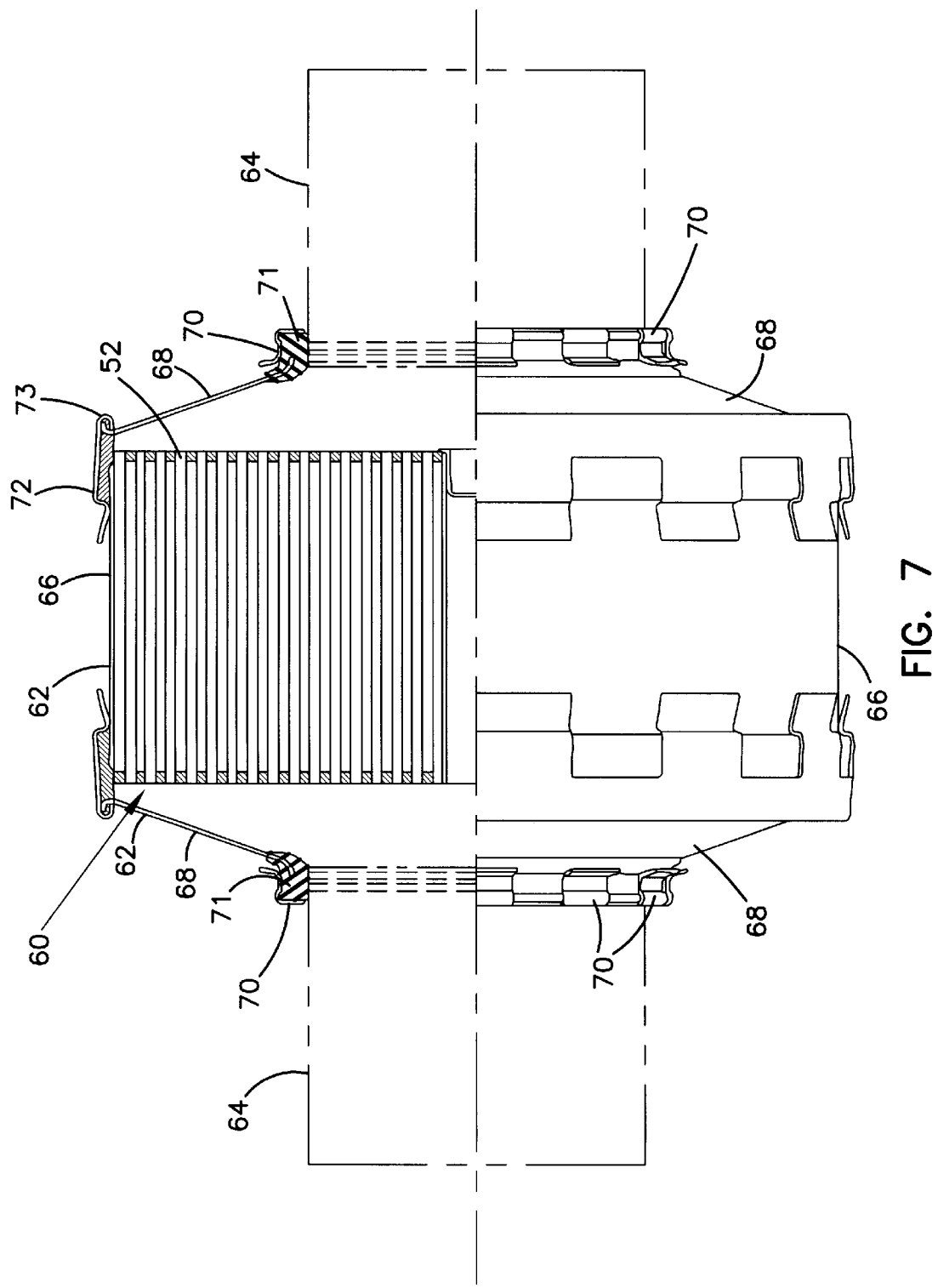
FIG. 7 shows a side elevational partially broken away view of a first embodiment of a filter apparatus according to the principles of the present invention, having an enlarged diameter cylindrical fluted filter element and snap together housing placed in a duct.

Referring now to FIG. 7, there is shown a first embodiment of a spiral filter apparatus according to the principles of the present invention, and generally designated 60. The filter apparatus 60 inserts into a duct 64 connecting to a housing 62. The filter housing 62 has a substantially widened diameter relative to the duct for receiving a cylindrical filter element 52 having a larger flow receiving face than the cross-sectional area of the duct 64. The filter housing 62 includes a skin or other outer protective layer or housing portion 66 and transitional portions 68 which flare outward from the diameter of the duct to the enlarged diameter outer housing layer 66. The housing 62 connects to the duct through plastic clip-type connectors 70 which snap the transitional portions 68 of the filter housing 62 to the duct 64. In addition, gaskets 71 provide a seal between the housing 62 and the duct 64 while clips 72 retain the transitional members 68 to the outer protective layer 66 of the filter 60. This provides quick and easy connection so that the transitional members 68 may be inserted and connected to the duct 64 and the filter housing 62. Gaskets 73 provide an air and/or liquid-tight seal between the outer portion 66 of the filter housing 62 and the transitional members of the housing 68. In this manner, the housing 62 serves as a portion of the duct 64.

It can be appreciated that although the outer housing portion 66 may be a structurally-supportive member such as plastic or other commonly used materials, it may also be just the sealed impermeable outer layer of the filter element 52. The outer housing portion 66 may be separate or integral with the filter element 52. It can be appreciated that the outer layer 66 must seal the filter element 52 so that filtered fluid does not escape to the exterior of the closed passage formed by the duct 64 and the filter 60. However, the fluted filter media is structurally self-supporting so that no additional structure may be required on the periphery of the filter element 52 for some filtering applications. It can also be appreciated that the clip and gasket arrangements of the embodiment shown provide for a quick and easy replacement and interchangeability of the filter elements 52 in the duct. The filter 60 placed in this position provides for substantially straight-through flow with relatively low pressure drop across the filter 60 and increased filter media area for the volume of filter.

Figure 8:
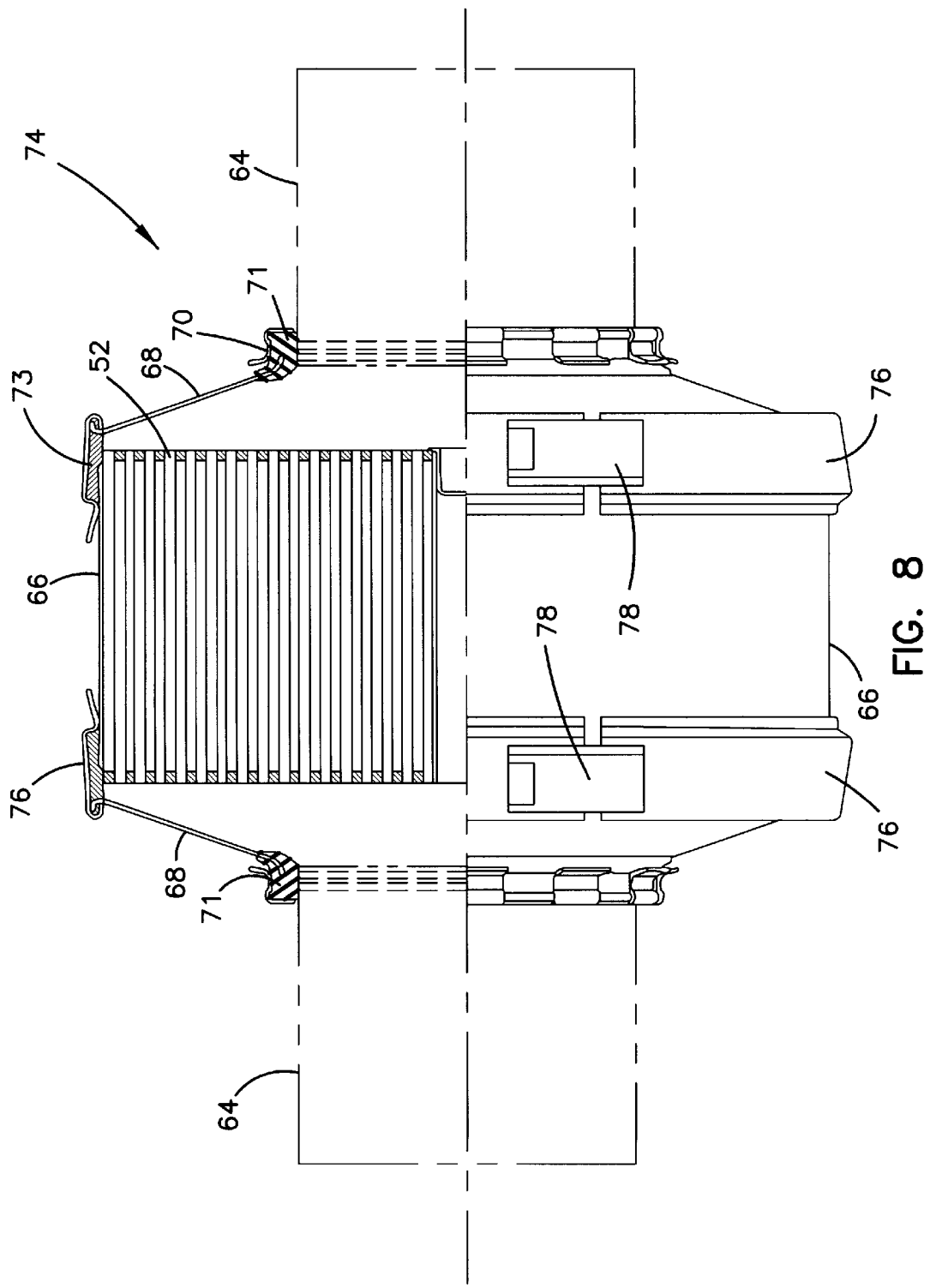
FIG. 8 shows a side elevational partially broken away view of a second embodiment of a filter apparatus according to the principles of the present invention, having an enlarged diameter cylindrical fluted filter element and buckled housing placed in a duct.

Referring now to FIG. 8, there is shown a second embodiment of an inline filter apparatus having a housing, generally designated 74. The second embodiment again includes a cylindrical-type filter element 52 inserting into a duct 64. The filter 74 has transitional members 68 and an outer filter housing portion 66. Clips 70 attach the housing 66 to the duct 64 and use gaskets 71 to form a seal between the housing 66 and the duct 64. However, the attachment between the filter element 52 and the transitional member 68 of the housing utilizes bands 76 extending around the filter 74 which have a plurality of tabs that clip on to the transitional members 68 and the exterior housing portion 66. Each of the bands 76 has a buckle 78 which can be tightened to provide a seal around gasket 73. The embodiment shown in FIG. 8 provides for quick and easy removal and interchangeability of the filter element 52. In addition, the filter 74 provides for substantially straight-through flow from the upstream to the downstream side of the duct 64.

Figure 9:
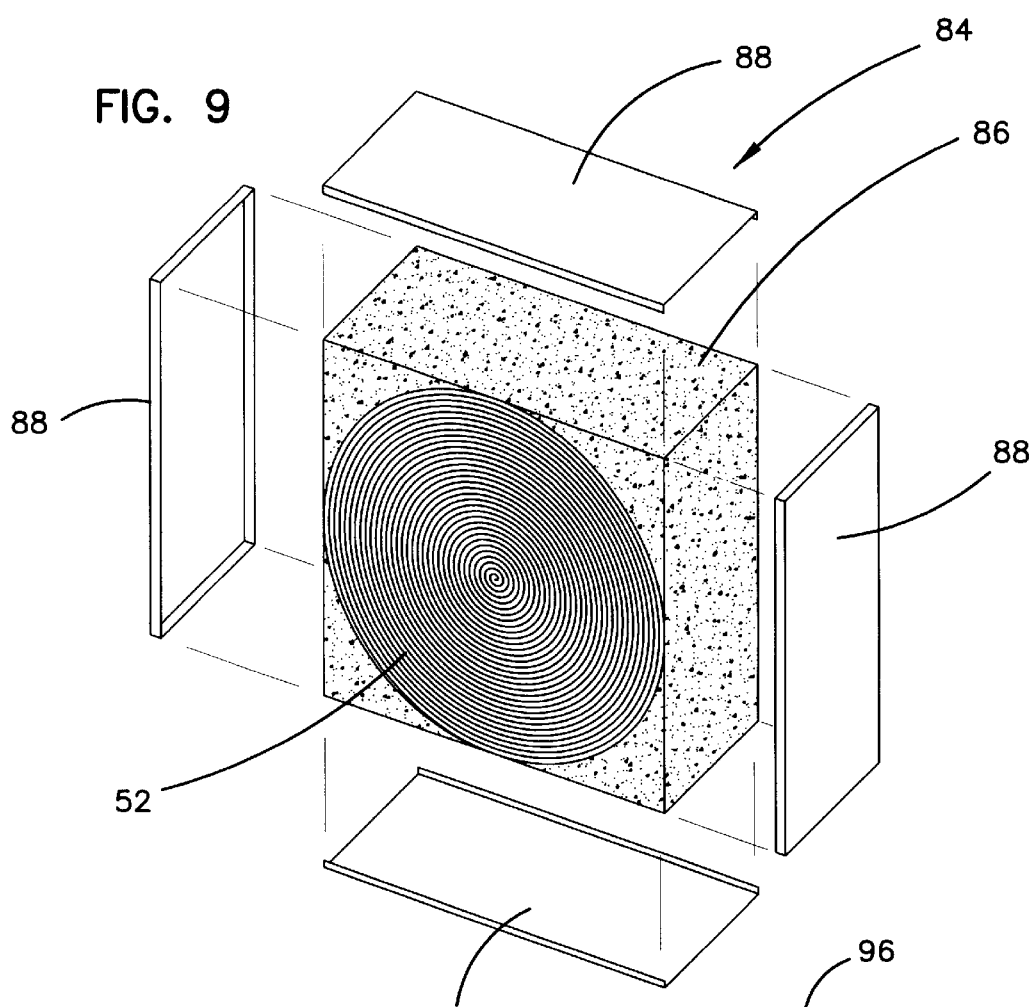
FIG. 9 shows an exploded perspective view of a cylindrical type filter apparatus with a second filtering material mounted therearound according to the principles of the present invention.

Referring now to FIG. 9, there is shown a further embodiment of the present invention, generally designated 84. According to the embodiment shown, a spiral filter element 52 is surrounded by non-permeable filler material 86, such as a solid urethane or other inexpensive lightweight impermeable material. The non-permeable filler material 86 is wrapped around the filter element 52 to fit within the sections of the housing 88 and provides for configuring the filter element to a wide variety of housing and/or duct shapes.

Figure 10:
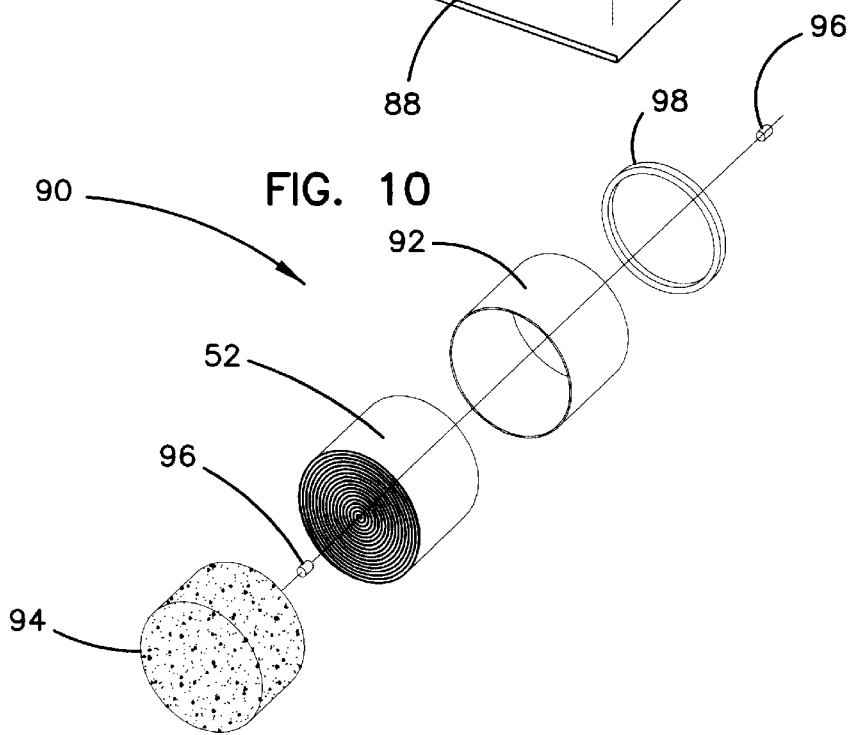
FIG. 10 shows an exploded perspective view of a cylindrical type filter apparatus according to the principles of the present invention.

For the embodiment shown in FIG. 10, a filter, generally designated 90, has a spiral filter element 52 which is preceded by a prefilter of open material, generally designated 94. A product suitable for the prefilter layer 94 is sold under the tradename Airlaid Media by Comulus Fiber Corp. located in Charlotte, N.C. For a thickness of 0.75", the open material has a density of 6.7 ounces/yd$^2$ and a solidity of 0.8%. Another suitable prefilter material having a thickness of 0.25" with a density of 3.62 ounces/yd$^2$ and a solidity of 1.6% is available from Chemwove Corp. in Charlotte, N.C. The prefiltering material 94 removes the larger particles and other contaminants prior to filtering through the fluted filter element 52. The filter element 90 may also include an outer housing 92, and if the center mandrel has been removed, center caps 96 extend through the center of the spiral filter element 52. An O-ring or other gasket 98 may be placed on the downstream side of the filter 94, providing a seal downstream to prevent escape of the filtered fluid and inlet of unfiltered fluids.

Figure 11:
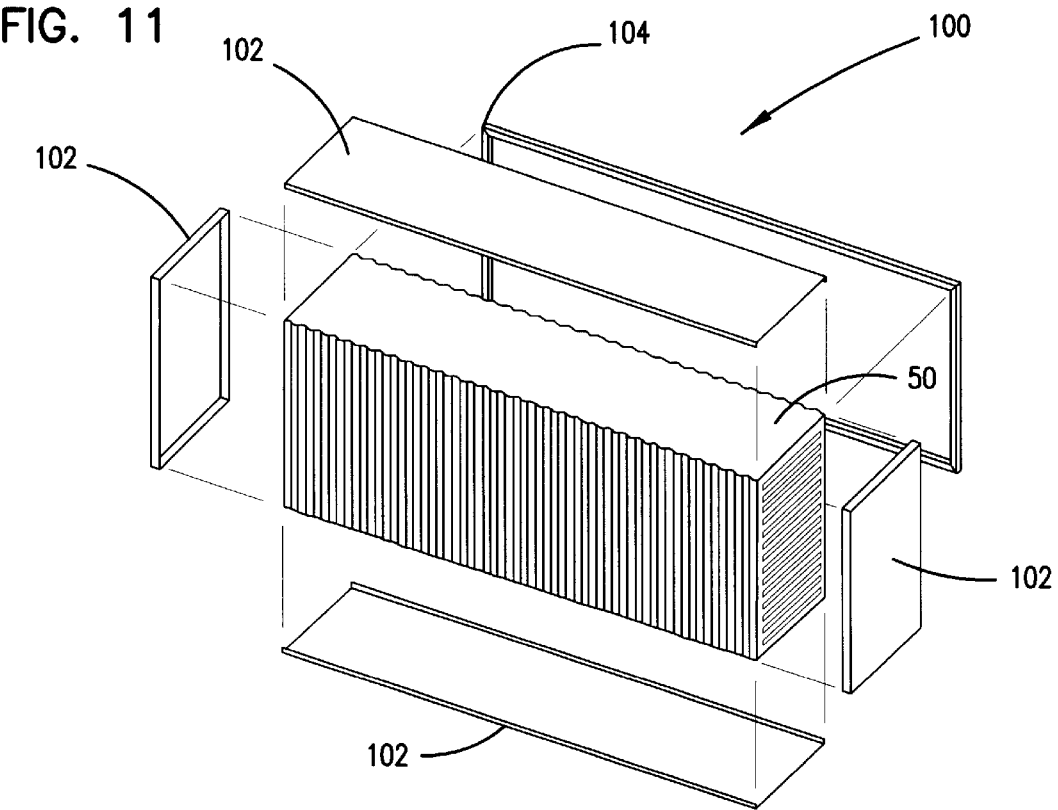
FIG. 11 shows an exploded perspective view of a block type filter apparatus according to the principles of the present invention.

Yet another embodiment of the present invention is shown in FIG. 11. Block filter 100 utilizes a block-filter element 50 and includes a housing 102 extending on the ends, top and bottom of the filter element 50. A gasket 102 is placed on the periphery of the block filter 100 on the downstream side to form a seal between the duct or other passage and the filter 100.

Figure 12:
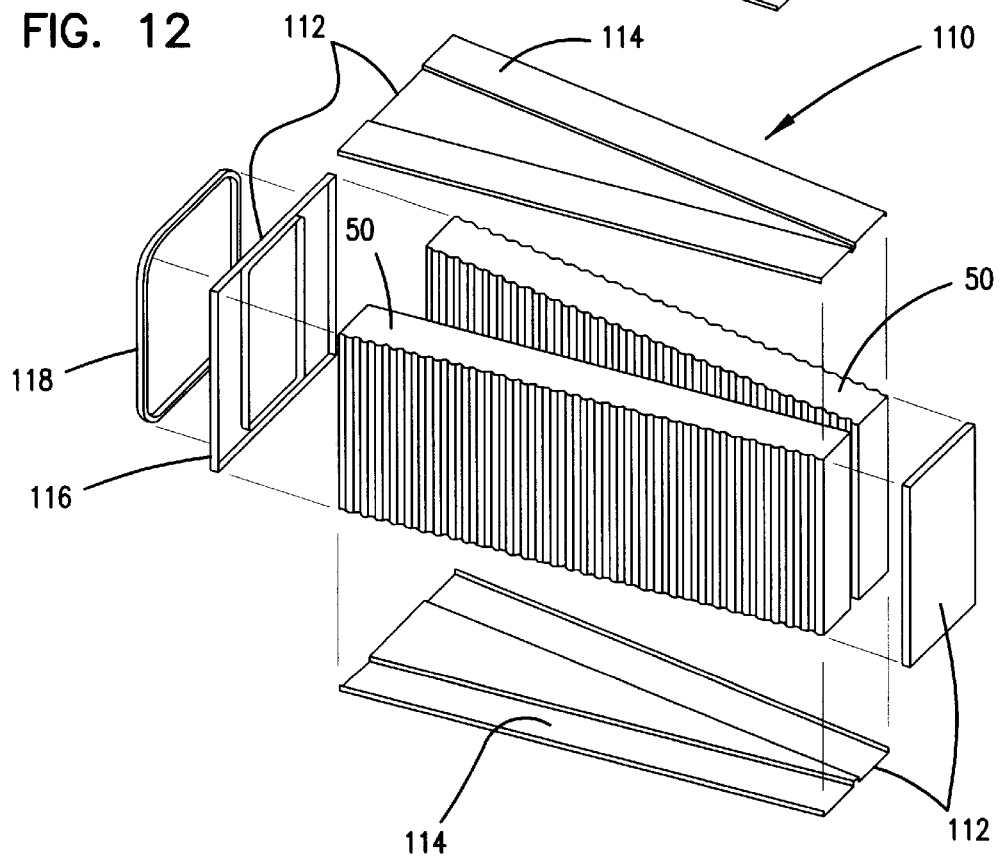
FIG. 12 shows an exploded perspective view of a V-block type filter apparatus according to the principles of the present invention.

Referring now to FIG. 12, there is shown yet another embodiment of the present invention utilizing a V-type filter, generally designated 110. The V-type filter utilizes a pair of block filter elements 50 which are arranged with one end in proximity and the second end diverging from the first end. Top and bottom spacing members 114 of the filter housing 112, as well as an end spacing member 116 retain the block filter elements 50 in their relative positions. With this configuration, flow enters both sides of the housing 112 and passes through the center orifice of the end spacing member 116. A gasket 118 provides a downstream seal to the housing 112. With this arrangement, the filter elements 50 may be cleaned with reverse air pulsing.

Figure 13A:
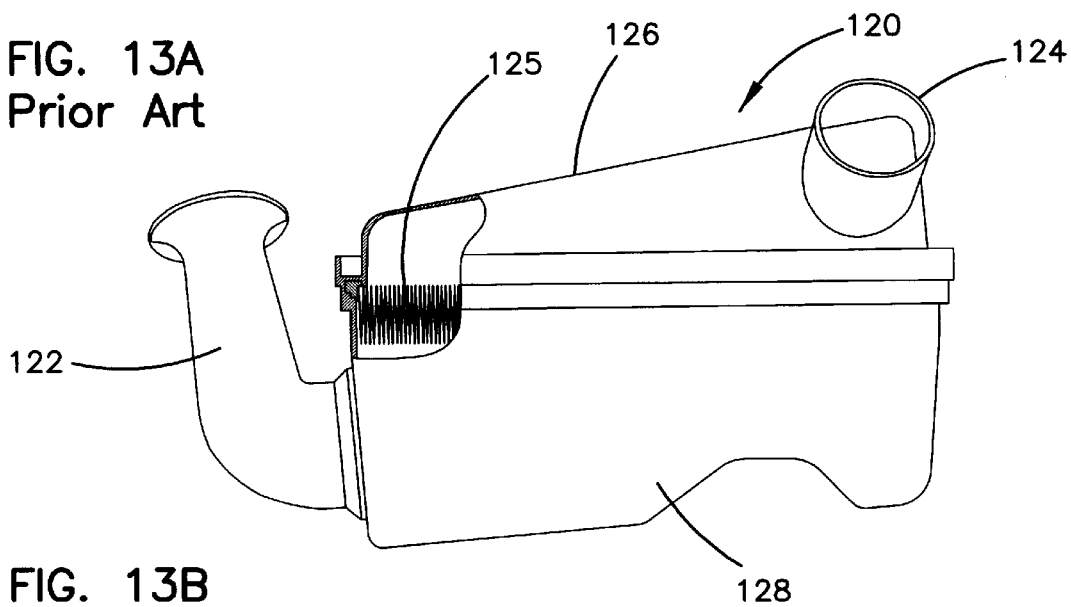
FIGS. 13A, 13B, and 13C show a front elevational, top plan, and right side partial views of a prior art filter housing configured for accepting a panel filter element.
Figure 13B:
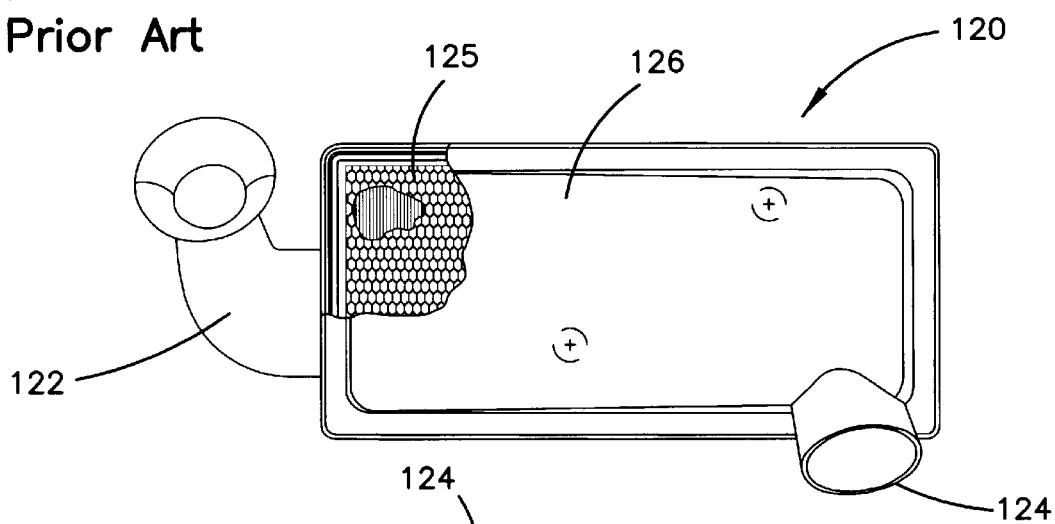
Figure 13C:
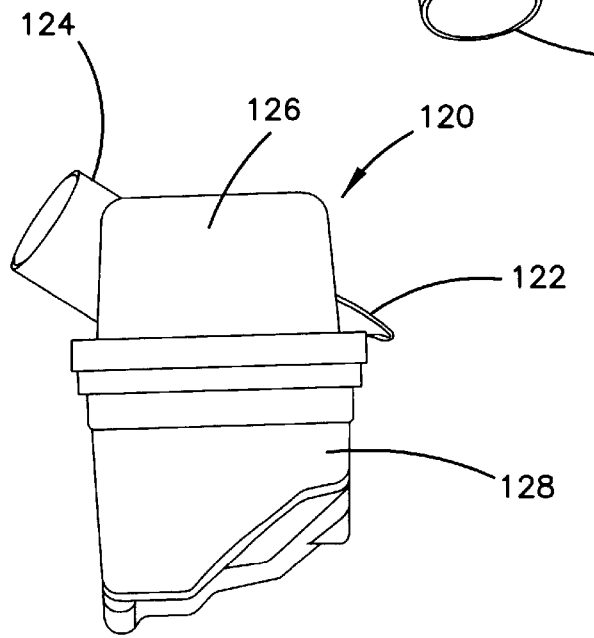

Referring to FIGS. 13A–13C, there is shown a prior art filter and housing, generally designated 120, utilized in an automobile engine. The filter housing includes an inlet 122 and an outlet 124. Housing sections 126 and 128 fit together to form a sealed filter chamber. The housing 120 is configured to form a substantially rectangular interior chamber, as most clearly shown in FIG. 13B, for receiving a panel filter element 125.

Figure 14A:
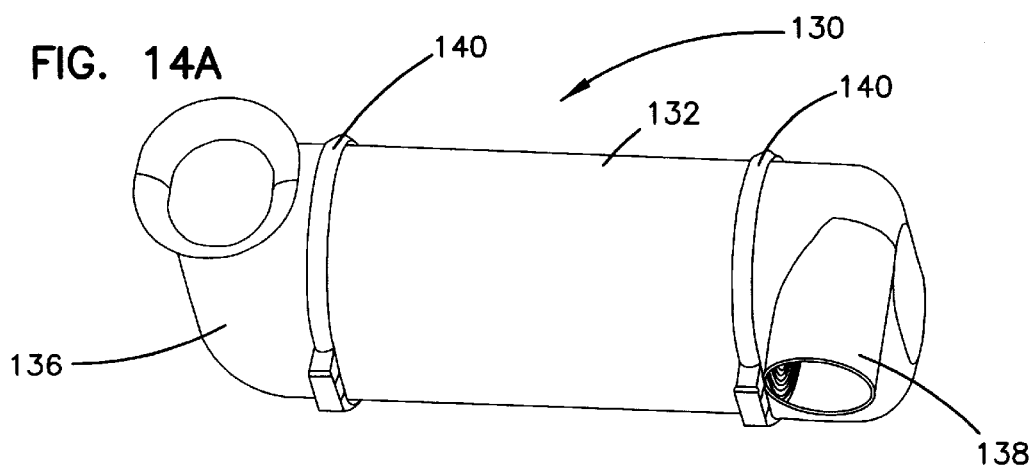
FIGS. 14A, 14B, and 14C show perspective views of a oval filter and housing according to the principles of the present invention.
Figure 14B:
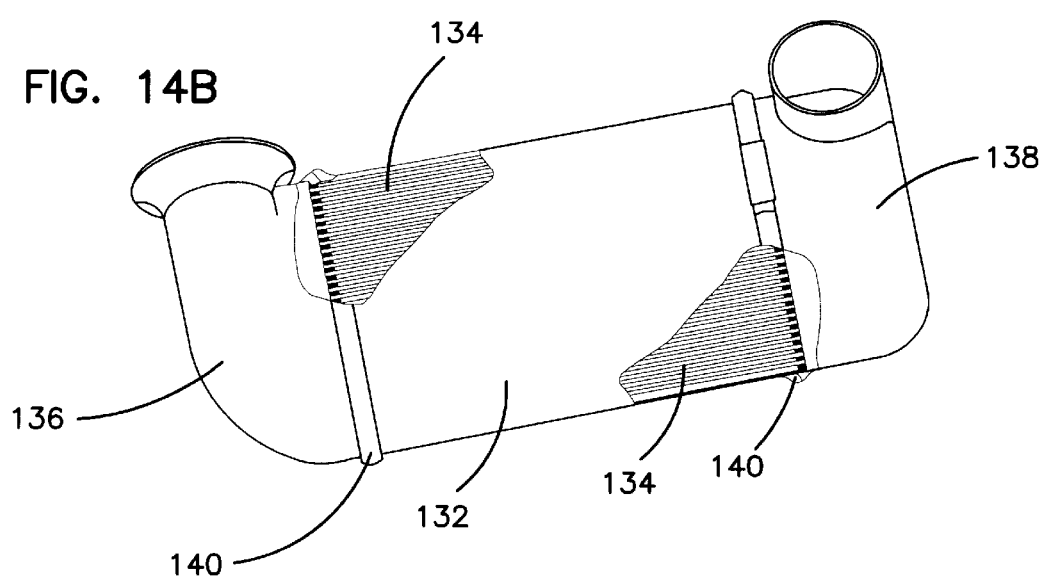
Figure 14C:
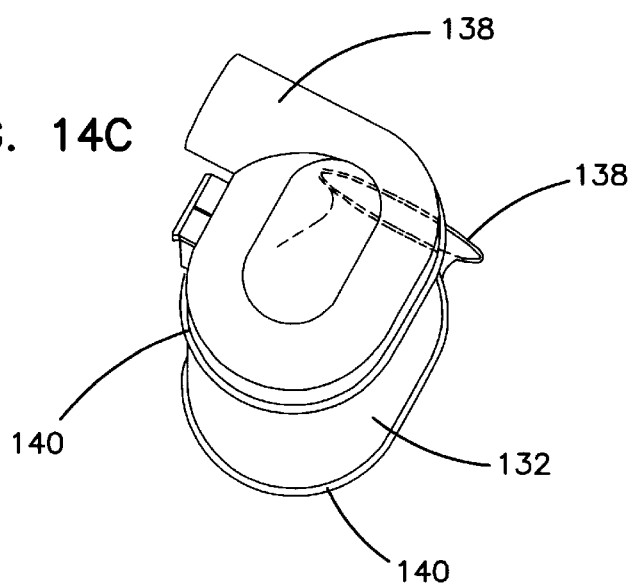

Shown in FIGS. 14A–14C is an oval filter, generally designated 130 which is suitable for replacing the prior art filter shown in FIGS. 13A–C. The oval filter 130 includes a housing 132 surrounding an oval profile fluted filtering element 134. As explained above, the housing 132 may just be a sealed impermeable exterior of the oval element 134 or a separate exterior housing member. In addition, the filter 130 includes an inlet element 136 and outlet element 138. These elements are clasped to the filter housing 132 by connector bands 140. In this manner, the filter element 134 may be easily removed and replaced by loosening and removing the bands and reinserting a new filter element 134. It can be appreciated that although an oval element is shown, other filter elements having different cross sections could also be utilized.

It can be appreciated that the filter elements of the present invention provide for greater filter media area in a much smaller housing volume than the prior art. For the panel filter shown in FIG. 13, the housing volume is 0.27 ft$^3$ and the filter media area is only 6.6 ft$^2$. However, for the fluted filter shown in FIG. 14, having a 9 inch long filter and a similar 0.27 ft$^3$ of filter housing volume, the filter has 35 ft$^2$ of filter media area. A similar 5" long fluted filter has a filter housing volume of 0.20 ft$^3$, but still has a filter media area of 21 ft$^2$. It can also be appreciated that the present invention provides for placing a filter element inline into a duct which typically is only slightly widened at the filter with a portion of the duct serving as the filter housing.

Figure 15:
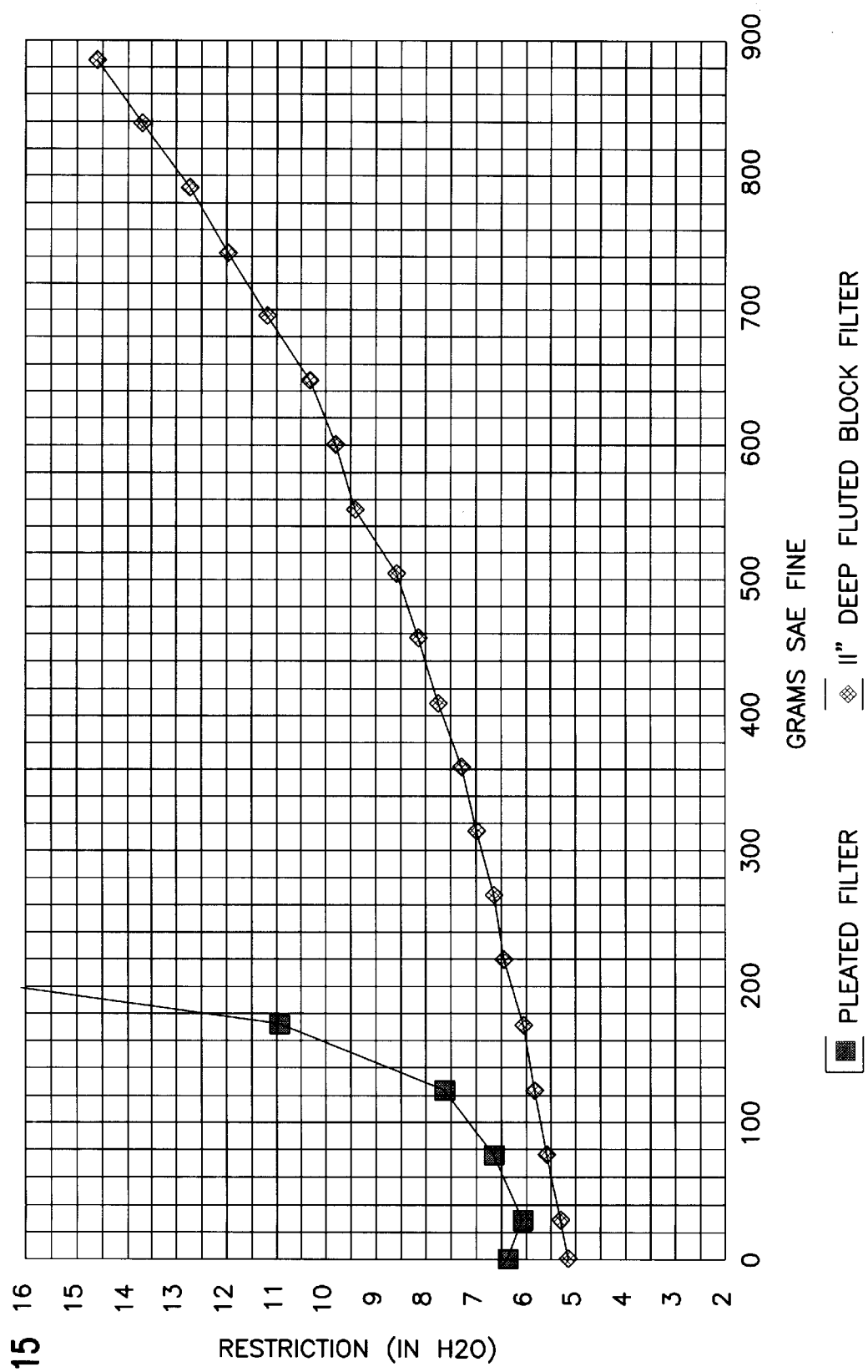
FIG. 15 shows a graph comparing pressure drop versus dust loading for the fluted filter media and standard filter media shown in FIGS. 13 and 14.

Referring now to FIG. 15, there is shown a graph comparing restriction across the filter to the amount of material deposited on the filter for the filters shown in FIGS. 13 and 14. It can be appreciated that as the filter loads, the restriction across the filter increases. However, it can be appreciated that although there is a gradual rise for fluted filters of the present invention, the restriction increases exponentially for the panel filter element shown in FIG. 13. Therefore, standard filters must be replaced after a much shorter interval and the design of the system may need to be adjusted to accommodate the increased restriction. Alternatively, the increased restriction may cause additional damage or require other design alterations to accommodate the increased restriction. It is generally recommended that air filters used with automobiles are replaced when the restriction rises above 14" of water. It can be appreciated that the panel filter shown in FIG. 13 requires replacement before 200 gms are loaded, while the fluted filter according to the principles of the present invention shown in FIG. 14 will not require replacement until over 800 gms are loaded.

Referring now to FIGS. 17–21, there is shown an alternate embodiment of the filter element, generally designated 150. The filter element 150 mounts in a housing having two sections including a fluid inlet and an outlet. The housing also includes a center post which is used for positioning prior art panel-type pleated filters. The filter element 150 includes fluted filter media 152 connected to a positioning bracket portion 154. In addition, a center recessed cup-type aligning member 156 receives the post from the housing to maintain the filter 150 in the correct position. Although an oval filter media element is shown, it can be appreciated that other common shapes, as explained hereinafter, could also be utilized. The bracket 154 seats on a ridge in the housing and retains the filter element 150 in the correct position. In addition, a gasket 158 seats against the housing to form a seal to prevent fluid from bypassing the filter element 150. The filter media 152 is the fluted filter media described above and is typically coiled about the center recessed member 156. However, a square or rectangular block type element may also be utilized and the center cut out to accommodate the post.

Figure 20:
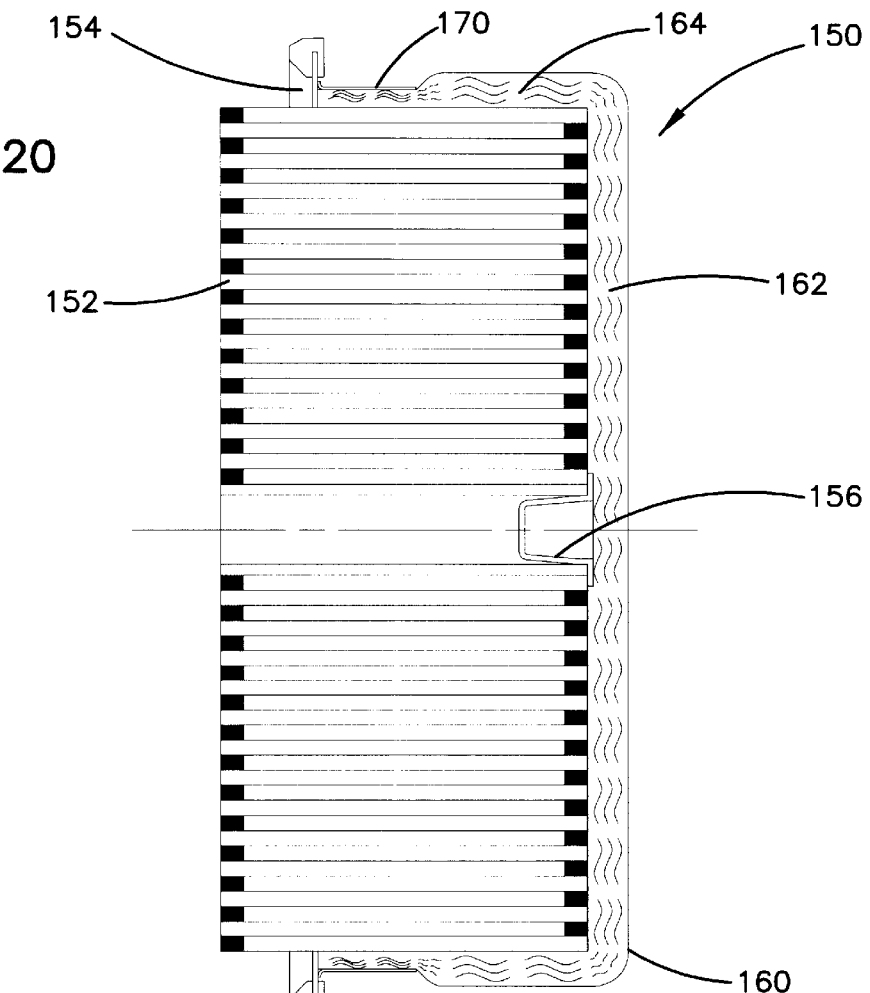
FIG. 20 shows a side sectional view of the filter element shown in FIG. 19.
Figure 18:
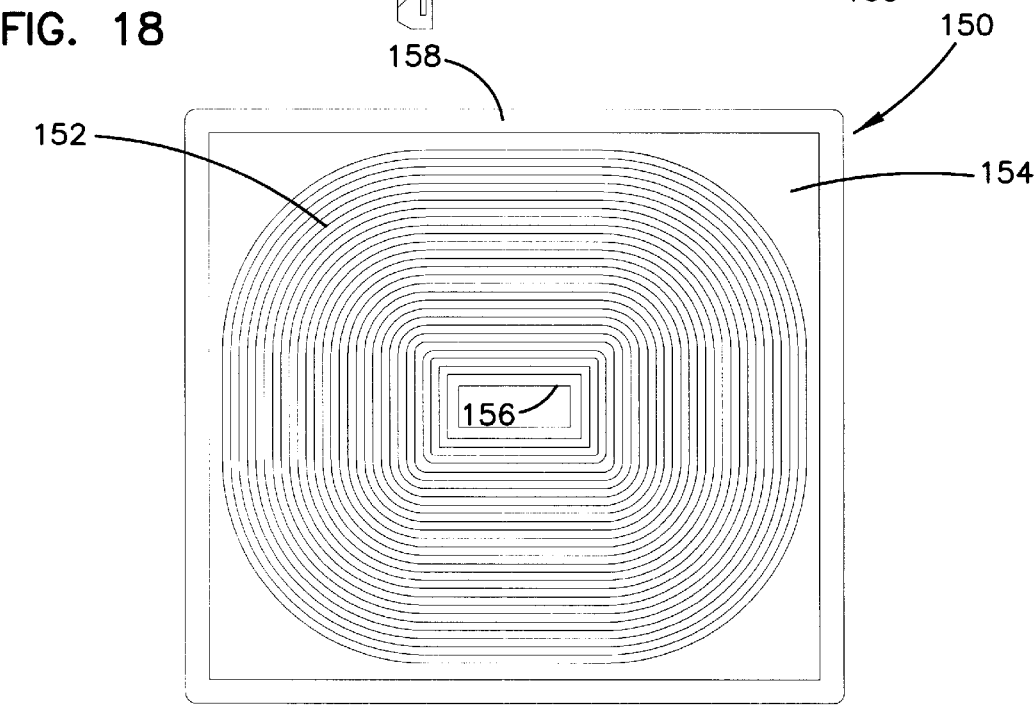
FIG. 18 shows a bottom plan view of the filter element shown in FIG. 17.

As shown in FIGS. 19–21, in addition to the fluted filter element 152, a prefilter element 160 is placed over the upstream portion of the filter media 152. The prefilter element 160 includes a top portion 162 and side portions 164 which substantially cover the filter media 152 upstream from the bracket 154. The sides of the filter element 152 provide added filtering capacity. The prefilter element 160 includes sides 164 to further increase capacity. A band 170 fits around the exterior of the prefilter element 160 and retains it in position. The band 170 includes an outward curled edge proximate the bracket 154 to ease assembly and removal and to provide a better seal around the exterior of the prefilter element 160. The band 170 may be bonded or otherwise secured in some applications. In a preferred embodiment, the prefilter material is an open material, such as that described above and shown in FIG. 10. However, other types of open materials which provide some prefilter and spacing to separate the ends of the flutes from possible large particles of debris that could clog flutes may also be utilized, such as reticulated foam. These open type materials may also be used wherein snow is present. The open porous structure of these materials absorbs the snow and acts to prevent the flutes of the filter element 162 from becoming plugged. It can be appreciated that the filter element 150 and the prefilter 160 may be independently changed and replaced depending on the required service interval or each element.

Figure 17:
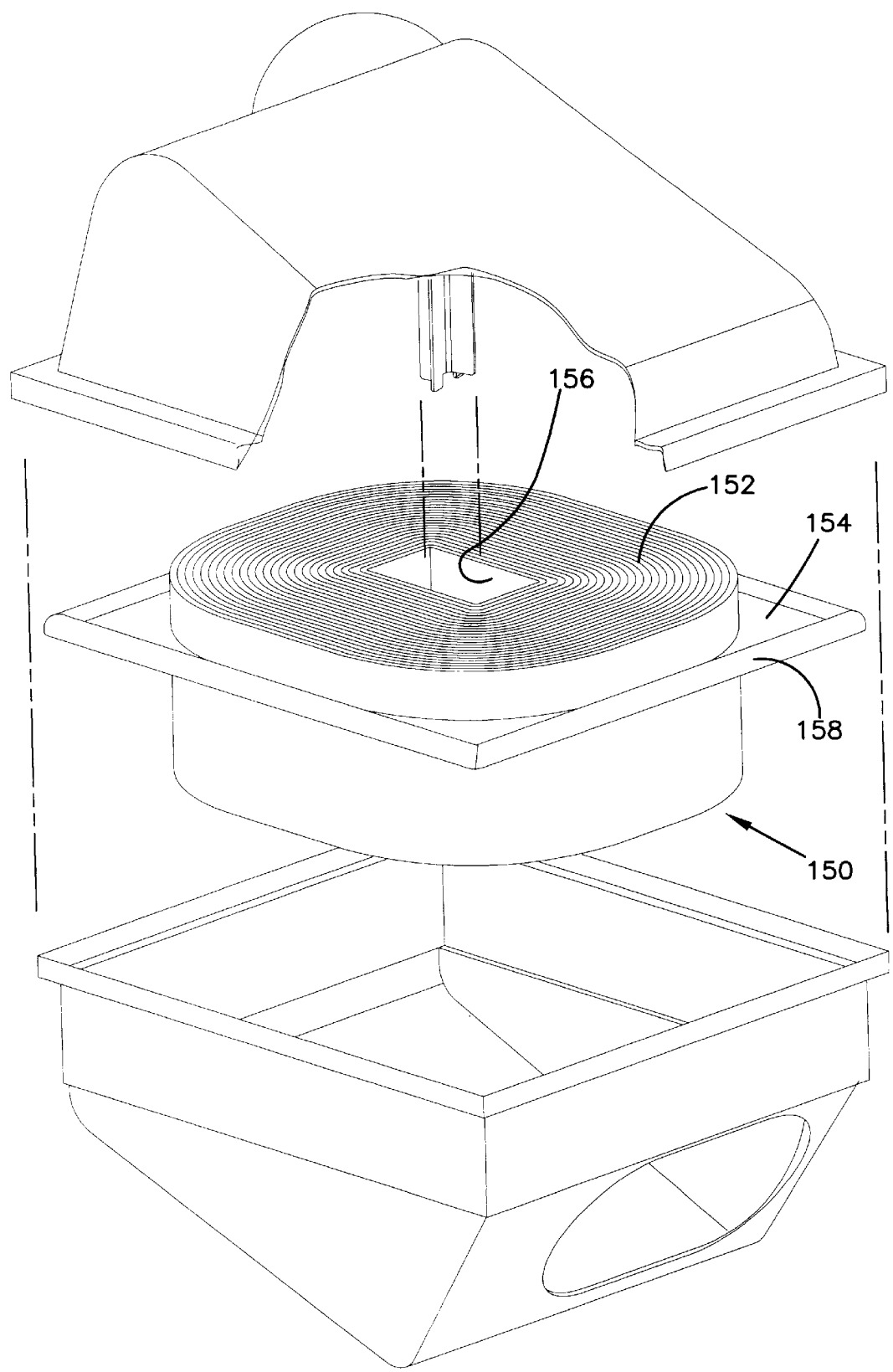
FIG. 17 shows an exploded perspective view of a filter housing, a panel filter element and a prefilter layer.
Figure 26:
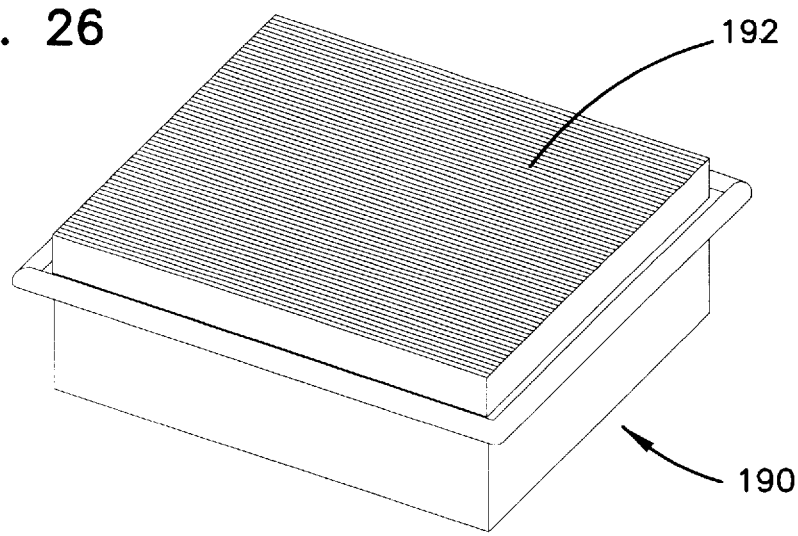
Figure 24:
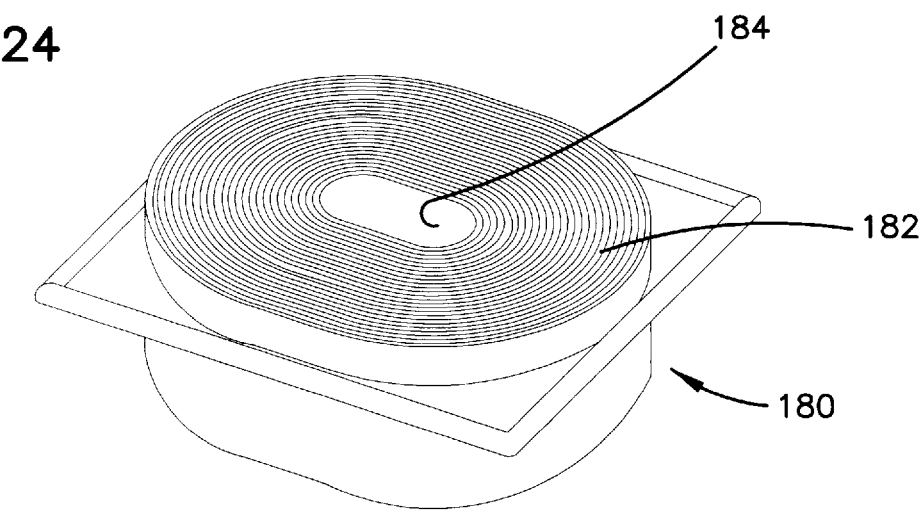
FIG. 24 shows a perspective view of an alternate embodiment of a fluted filter element for the filter housing shown in FIG. 17.
Figure 25:
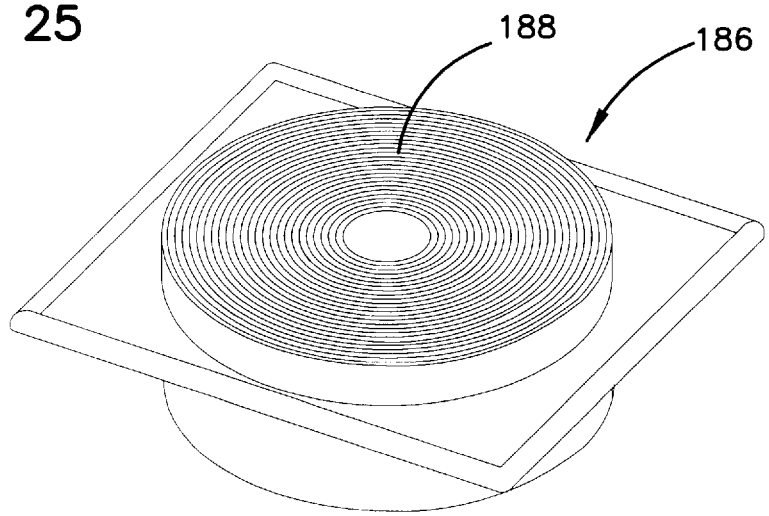
FIG. 25 shows a perspective view of an alternate embodiment of a fluted filter element for the filter housing shown in FIG. 17; and, FIG. 26 shows a perspective view of an alternate embodiment of a fluted filter element for the filter housing shown in FIG. 17.

In addition to the oval filter element 150 shown in FIG. 17, filter elements having a different shaped profile may also be utilized. As shown in FIG. 24, filter element 180 includes oval shaped filter media 182 coiled around an oval center member 184. As shown in FIG. 25, filter element 186 includes round filter media 188. As shown in FIG. 26, filter element 190 includes block type filter media 192. It can be appreciated that other shapes could also be utilized and that prefilter elements could be configured to mount to the filter media.

Figure 22:
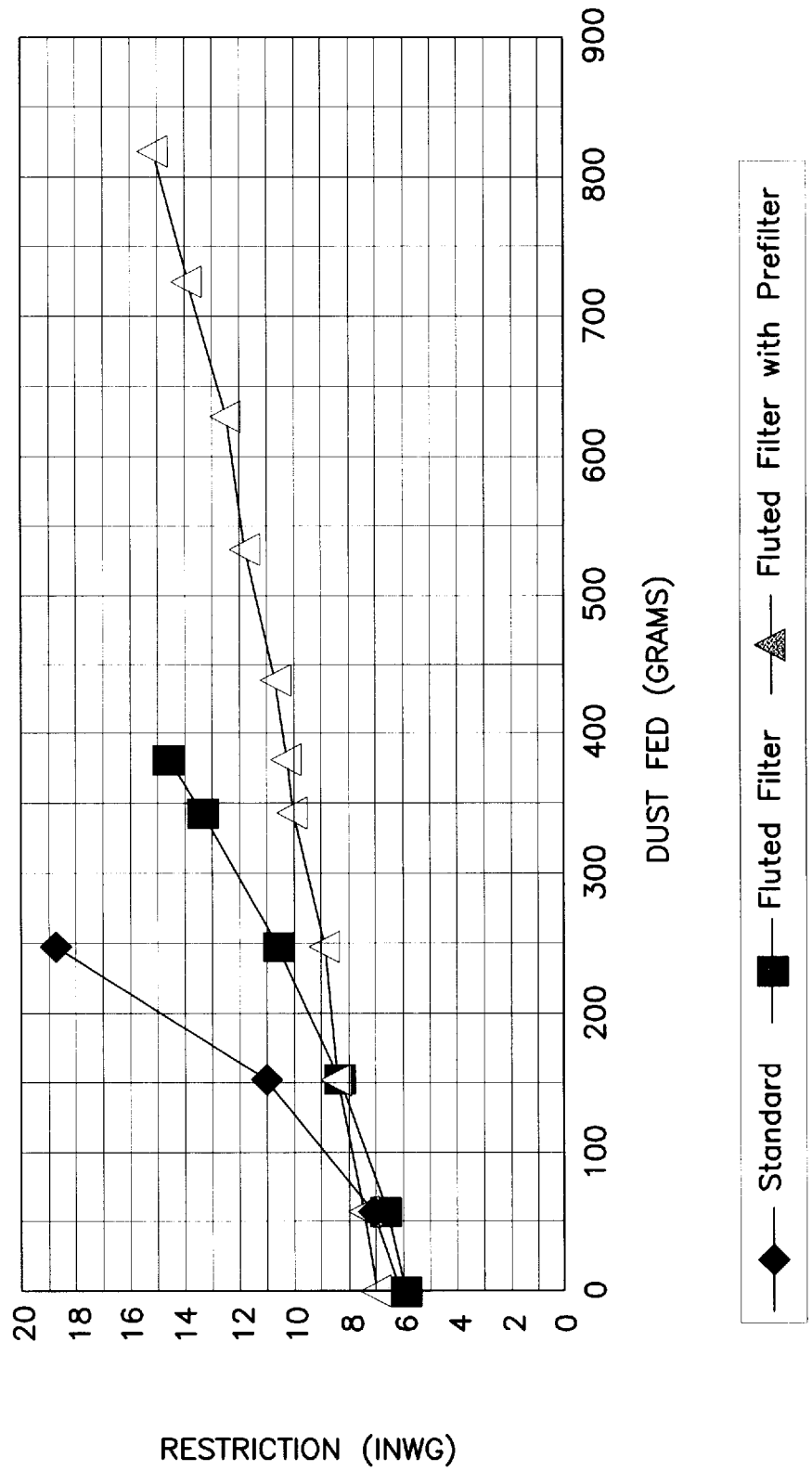
FIG. 22 shows a graph restriction across the filter versus dust loading for a standard filter element for the filter housing shown in FIG. 17, the fluted filter element shown in FIG. 17, and the fluted filter element with the prefilter layer shown in FIG. 18.

Referring now to FIG. 22, there is shown a graph of restriction across the filter element as the filter element loads with dust and particulate. The graph is for a 5.9 liter diesel with the standard fan-type pleated filter being shown, as well as the restriction and dust loading for the filter element 150, and the filter element 150 having a prefilter 160 mounted thereon. It can be appreciated that 14 inches of restriction is the recommended change out, so that the pleated filter normally is changed before 200 grams of dust are loaded onto the filter. For the fluted filter element 150, changing is generally not required until almost 400 grams of dust are loaded onto the filter, or almost twice the capacity of a standard pleated filter. Even further improvement is shown when the prefilter material 160 is used on the filter element

150. Nearly 750 grams of dust are loaded before 14 inches of restriction is found across the filter element. Therefore, almost four times the capacity of the pleated filter is obtained when the fluted filter element 150 is utilized with a prefilter element 160.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the attached claims are expressed.

What is claimed is:

1. An air filter cartridge device for inserting into a duct having an upstream side and downstream side with flow passing from the upstream side to the downstream side through the filter cartridge, comprising:

structurally self-supporting fluted filtering media having an outer portion, the filter media comprising a plurality of substantially parallel flutes extending along the direction from the upstream side to the downstream side;

an integrally formed impermeable layer enclosing the outer portion of the fluted filter media forming an outer wall of the duct over the fluted filter media and connecting to upstream and downstream portions of the duct; and, means for forming a seal between the integrally formed impermeable layer and the duct on the downstream side of the filter media when the filter media is inserted into the duct.

2. A filter device according to claim 1, wherein the filter includes an upstream face and a downstream face, and wherein the upstream face of the filter engaging the flow comprises a cross sectional flow approach area greater than the cross sectional area of the duct.

3. A filter device according to claim 1, further comprising sealing means extending between the duct and the impermeable layer and a tightening band engaging the sealing means.

4. A filter device according to claim 3, wherein the sealing means further comprises an annular gasket member.

5. A filter device according to claim 4, wherein the sealing means extending between the impermeable layer and the duct comprises an upstream seal and a downstream seal.

6. A filter device according to claim 1, wherein the filter is aligned relative to the upstream flow to provide substantially straight through parallel flow from the duct upstream to downstream through the filter.

7. A filter device for inserting into a duct having flow passing from an upstream side to a downstream side through the filter, comprising:

structurally self-supporting fluted filtering media having a plurality of substantially parallel flutes defining an outer portion, wherein the flutes are aligned relative to the flow to provide flow through the filter device substantially longitudinally in a substantially straight line from the upstream side to the downstream side wherein the filtering media comprises alternating first and second flutes having an open upstream face, wherein the first flutes include closed portions recessed a first distance from the upstream face of the flutes and the second flutes include closed portions recessed a second distance greater than the first distance from the upstream face of the flutes;

an impermeable protective layer enclosing the outer portion of the filter media; and, a seal between the protective layer on the downstream side of the filter media and the duct when the filter media is placed in the duct.

8. A filter device according to claim 1, wherein the filter media is configured in a substantially rectangular block configuration.

9. A filter device according to claim 1, wherein the filter media is configured in a an oval configuration.

10. A filter device according to claim 1, further comprising prefiltered open material upstream of the fluted filter media.

11. A filter device according to claim 1, wherein the filter comprises a pair of filter blocks configured in a V-type configuration.

12. A filter device having an upstream side and a downstream side and flow passing from the upstream side to the downstream side through the filter, comprising:

structurally self-supporting fluted filtering media aligned longitudinally from the upstream side to the downstream side having an outer portion;

an integral impermeable layer enclosing the outer portion of the filter media; and, an open filter material element intercepting flow upstream from the self-supporting fluted filtering media and abutting the impermeable layer.

13. A filter device according to claim 12, wherein the open filter material comprises an element having a base and side portions extending over an upstream face and upstream portions of sides of the fluted filtering media.

14. A filter device according to claim 13, further comprising a band extending around a periphery of the open filter element.

15. A filter device according to claim 12, further comprising a positioning bracket extending from sides of the filter media.

16. A filter device according to claim 12, wherein the fluted filtering media comprises a filter element having an oval configuration.

17. A filter device according to claim 12, wherein the fluted filtering media comprises a filter element having a round configuration.

18. A filter device according to claim 12, wherein the fluted filtering media comprises a filter element having a substantially rectangular configuration.

19. A filter device according to claim 15, further comprising a band extending around a periphery of the open filter element including an edge flaring outward and engaging the bracket extending from the sides of the fluted filtering media.

20. A filter device according to claim 12, further comprising a bracket portion mounting to the periphery of the fluted filtering media.

21. A filter device according to claim 7, wherein the filter media is configured in a substantially cylindrical configuration.

22. A filter device for inserting into a duct having an upstream side and a downstream side and flow passing from the upstream side to the downstream side through the filter, comprising:

structurally self-supporting fluted filtering media having a plurality of substantially parallel flutes defining an outer portion, wherein the flutes are aligned relative to the upstream flow to provide flow through the filter device substantially parallel to the direction from the upstream side to the downstream side;

an integral impermeable protective skin enclosing the outer portion of the filter media and forming an intermediate filtering duct section engaging upstream and downstream sections of the duct; and, means for sealing a connection between the protective layer and the duct on the downstream side of the filter media when the filter media is placed in the duct.

23. A filter cartridge device according to claim 3, wherein the filter device includes clip connectors for attaching to and sealing against the sealing means.

24. A filter device according to claim 10, wherein the prefiltering open material extends over the upstream side and around an upstream edge of the filter media.

25. A filter cartridge according to claim 1, wherein the integrally formed impermeable layer comprises an impermeable coating applied to the outer portion of the filter media.

26. A filter device according to claim 25, further comprising a seal formed between the impermeable layer and the upstream section of the duct.

27. A filter device according to claim 26, wherein the filter cartridge removably mounts to the upstream and downstream sections of the duct.

28. A filter device according to claim 1, wherein the integrally formed impermeable layer comprises a plastic or urethane skin applied to the outer portion of the fluted filter media.

* * * * *